(12) United States Patent
Hsiao et al.

(10) Patent No.: US 10,951,123 B2
(45) Date of Patent: *Mar. 16, 2021

(54) POWER CONVERSION SYSTEM

(71) Applicant: Chicony Power Technology Co., Ltd., New Taipei (TW)

(72) Inventors: Yung-Hung Hsiao, New Taipei (TW); Chia-Hsien Yen, New Taipei (TW); Lieh-Chung Yin, New Taipei (TW); Cheng-Chang Hsiao, New Taipei (TW); Hao-Te Hsu, New Taipei (TW)

(73) Assignee: CHICONY POWER TECHNOLOGY CO.. LTD., New Taipei (TW)

( * ) Notice: Subject to any disclaimer, the term of this patent is extended or adjusted under 35 U.S.C. 154(b) by 496 days.

This patent is subject to a terminal disclaimer.

(21) Appl. No.: 15/706,785

(22) Filed: Sep. 18, 2017

(65) Prior Publication Data

US 2018/0069485 A1 Mar. 8, 2018

Related U.S. Application Data

(63) Continuation-in-part of application No. 15/704,007, filed on Sep. 14, 2017, now Pat. No. Re. 47,423, and (Continued)

(30) Foreign Application Priority Data

Oct. 12, 2015 (TW) .................................. 104133388

(51) Int. Cl.
*H02M 3/335* (2006.01)
*H02M 7/08* (2006.01)
(Continued)

(52) U.S. Cl.
CPC .... *H02M 3/33592* (2013.01); *H01F 27/2804* (2013.01); *H01F 27/40* (2013.01);
(Continued)

(58) Field of Classification Search
CPC .......... H02M 7/08; H02M 1/14; H02M 7/003; H02M 3/28; H02M 2001/009
(Continued)

(56) References Cited

U.S. PATENT DOCUMENTS 4,864,486 A 9/1989 Spreen
5,353,001 A 10/1994 Meinel et al.
(Continued)

FOREIGN PATENT DOCUMENTS

CN 100570768 C 12/2009
CN 201796673 U 4/2011
(Continued)

OTHER PUBLICATIONS

Chao Yan et al., "A Novel Transformer Structure for High power, High Frequency converter", Power Electronics Specialists Conference, 2007, 214-218, IEEE.
(Continued)

*Primary Examiner* — Minh Nguyen
(74) *Attorney, Agent, or Firm* — CKC & Partners Co., LLC

(57) ABSTRACT

A power conversion system is provided. The system includes a switch module, a resonant module, a magnetic conversion module, a bobbin and an iron core. The magnetic conversion module includes a primary winding and a PCB winding module. The PCB winding module includes a printed circuit board, a conductive layer disposed on at least one surface of the printed circuit board, and a switch unit disposed on the printed circuit board.

16 Claims, 32 Drawing Sheets

Related U.S. Application Data a continuation-in-part of application No. 15/073,319, filed on Mar. 17, 2016, now Pat. No. 9,837,886, which is an application for the reissue of Pat. No. 9,559,609.

(60) Provisional application No. 62/466,383, filed on Mar. 3, 2017.

(51) Int. Cl.

| | |
|---|---|
| *H02M 1/14* | (2006.01) |
| *H02M 3/28* | (2006.01) |
| *H02M 7/00* | (2006.01) |
| *H01F 27/28* | (2006.01) |
| *H01F 27/40* | (2006.01) |
| *H02M 1/00* | (2006.01) |

(52) U.S. Cl.
CPC .............. *H02M 1/14* (2013.01); *H02M 3/28* (2013.01); *H02M 3/285* (2013.01); *H02M 7/003* (2013.01); *H02M 7/08* (2013.01); *H01F 2027/2819* (2013.01); *H02M 2001/009* (2013.01); *H02M 2001/0058* (2013.01); *Y02B 70/10* (2013.01)

(58) Field of Classification Search
USPC .............. 310/71, 68 R, 68 D, 194, 201, 208; 363/125, 126, 7, 15, 34, 21.06
See application file for complete search history.

(56) References Cited

U.S. PATENT DOCUMENTS

| | | | |
|---|---|---|---|
| 5,781,093 A | 7/1998 | Grandmont et al. | |
| 6,124,778 A | 9/2000 | Rowley et al. | |
| 6,188,306 B1 | 2/2001 | Wollesen | |
| 6,211,767 B1 | 4/2001 | Jitaru | |
| 6,420,953 B1 | 7/2002 | Dadafshar | |
| 6,429,763 B1 | 8/2002 | Patel et al. | |
| 6,788,184 B2 | 9/2004 | Roche | |
| 7,414,510 B1 | 8/2008 | Cheng | |
| 7,688,171 B2 | 3/2010 | Tsai et al. | |
| 8,232,674 B2 * | 7/2012 | Phadke | H02M 3/285 |
| | | | 307/31 |
| 8,232,856 B2 | 7/2012 | Zeng et al. | |
| 8,724,348 B2 * | 5/2014 | Sase | H02M 3/33592 |
| | | | 363/131 |
| 8,994,487 B2 | 3/2015 | Lin et al. | |
| 9,478,334 B2 | 10/2016 | Park et al. | |
| 2005/0083714 A1 | 4/2005 | Zhu et al. | |
| 2005/0110606 A1 | 5/2005 | Vinciarelli | |
| 2005/0212640 A1 | 9/2005 | Chiang et al. | |
| 2006/0279394 A1 | 12/2006 | Estrov | |
| 2007/0152795 A1 * | 7/2007 | Zeng | H01F 27/2804 |
| | | | 336/212 |
| 2012/0243262 A1 | 9/2012 | Ger et al. | |
| 2014/0085036 A1 | 3/2014 | Hu | |
| 2014/0292471 A1 | 10/2014 | Ho et al. | |
| 2015/0243431 A1 | 8/2015 | Garrity et al. | |
| 2017/0047159 A1 | 2/2017 | Itoh et al. | |

FOREIGN PATENT DOCUMENTS

| | | |
|---|---|---|
| CN | 102223091 A | 10/2011 |
| CN | 202502881 U | 10/2012 |
| CN | 105826056 A | 8/2016 |
| CN | 106160476 A | 11/2016 |
| CN | 106340375 A | 1/2017 |
| EP | 1559120 B1 | 1/2008 |
| EP | 2337039 A2 | 6/2011 |
| EP | 2811494 A1 | 12/2014 |
| EP | 3032550 A1 | 6/2016 |
| GB | 2259610 A | 3/1993 |
| GB | 2435964 A | 9/2007 |
| GB | 2447324 A | 9/2008 |
| GB | 2447963 A | 10/2008 |
| TW | 200637123 A | 10/2006 |
| TW | I278876 B | 4/2007 |
| TW | 200952002 A | 12/2009 |
| TW | 201239921 A | 10/2012 |
| WO | 9735378 A1 | 9/1997 |
| WO | 02103723 A1 | 12/2002 |
| WO | 03015250 A2 | 2/2003 |
| WO | 2004040600 A1 | 5/2004 |
| WO | 2008119935 A1 | 10/2008 |
| WO | 2012067923 A1 | 5/2012 |
| WO | 2012116263 A1 | 8/2012 |
| WO | 2016137637 A2 | 9/2016 |
| WO | 2016160775 A1 | 10/2016 |

OTHER PUBLICATIONS

David Reusch et al., "High Frequency Bus Converter with Low Loss Integrated Matrix Transformer", Applied Power Electronics Conference and Exposition (APEC), 2012, 1392-1397, IEEE.

David Reusch et al., "High Frequency Isolated Bus Converter with Gallium Nitride Transistors and Integrated Transformer", Energy Conversion Congress and Exposition (ECCE), 2012, 3895-3902, IEEE.

Duk-You Kim et al., "High-Efficiency Slim Adapter with Low-Profile Transformer Structure", Transactions on Industrial Electronics, Sep. 2012, 3445-3449, vol. 59, No. 9, IEEE.

Haifen Fan et al., "High-Frequency Transformer Isolated Bidirectional DC—DC Converter Modules with High Efficiency Over Wide Load Range for 20 kVA Solid-State Transformer", Transactions on Power Electronics, Dec. 2011, 3599-3608, vol. 26, No. 12, IEEE.

Dianbo Fu et al., "Investigation on Transformer Design of High Frequency High Efficiency DC—DC Converters", Applied Power Electronics Conference and Exposition (APEC), 2010, 940-947, IEEE.

Daocheng Huang et al, "LLC Resonant Converter with Matrix Transformer", Transactions on Power Electronics, Aug. 2014, 4339-4347, vol. 29, No. 8, IEEE.

Wei Chen et al., "Model and design of PCB Parallel Winding for Planar Transformer", Transactions on Magnetics, Sep. 2003, 3202-3204, vol. 39, No. 5, IEEE.

Jianbing Li et al, "Modeling, Simulation and Optimization Design of PCB Planar Transformer", Electrical Machines and Systems, 2005, 1736-1739, IEEE.

Dianbo Fu, "Topology Investigation and System Optimization of Resonant Converters", Topology investigation and system optimization of resonant converters (Doctoral dissertation), 2010.

\* cited by examiner

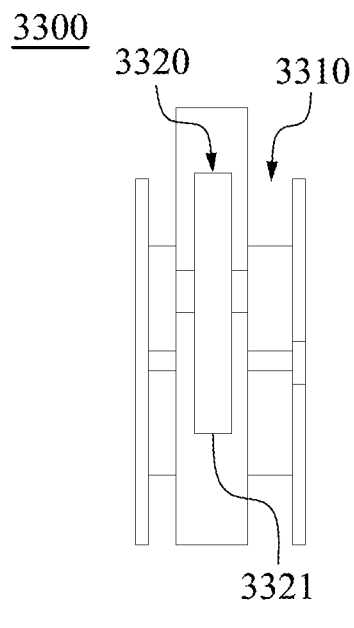
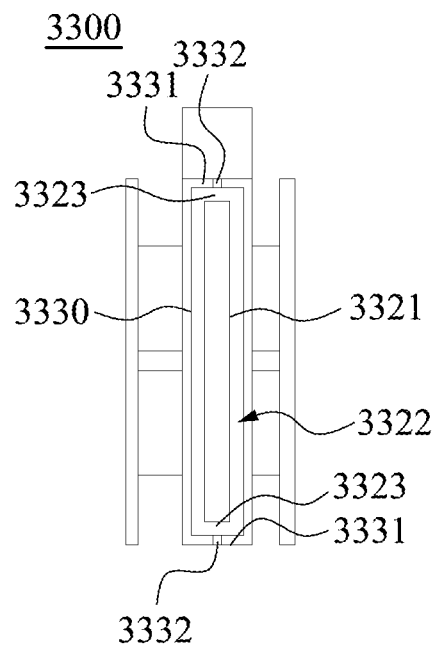
Fig. 32	Fig. 33
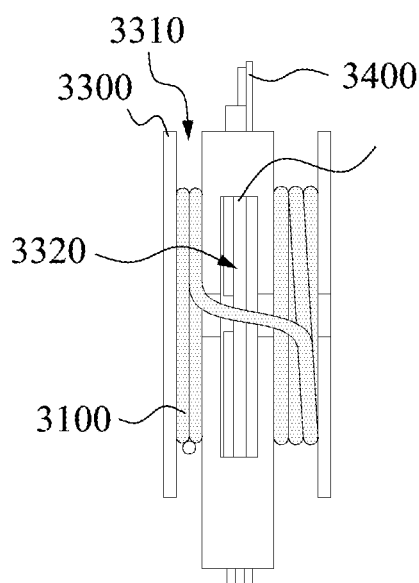
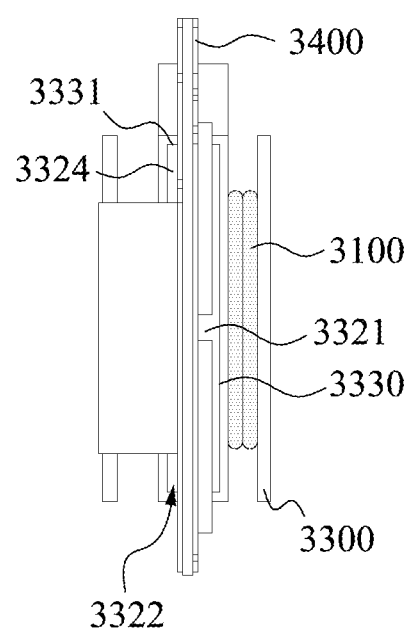
Fig. 34	Fig. 35

POWER CONVERSION SYSTEM

CROSS-REFERENCE TO RELATED APPLICATIONS

This application is a continuation-in-part of U.S. application Ser. No. 15/704,007, filed Sep. 14, 2017, which is a reissue application of U.S. Pat. No. 9,559,609 B2, issued Jan. 31, 2017, which are herein incorporated by reference in their entireties. This application is a continuation-in-part of U.S. application Ser. No. 15/073,319, filed Mar. 17, 2016, which claims priority to Taiwan Application Serial Number 104133388, filed Oct. 12, 2015, which are herein incorporated by reference in their entireties. This application claims priority to Provisional Application No. 62/466,383, filed Mar. 3, 2017, which is incorporated by reference herein in its entirety.

BACKGROUND

Field of Invention

The present invention relates to power conversion systems.

Description of Related Art

Since diode and Schottky diode have designated forward bias, the power loss of the power conversion system having the diode or Schottky diode to rectify power is large. Metal-oxide-semiconductor field-effect transistor (MOSFET) has advantages of low input resistance, short response time, and high input resistance, thus it replaces the diode and Schottky diode to be the main component of the rectifier.

In general, the power conversion system includes a plurality of synchronous rectifiers, which are driven at the same time the rectify power entering thereto. Specifically, when an electronic device electrically connected to the power conversion system is activated, the synchronous rectifiers perform synchronous rectifying procedure, and the MOSFETs of the synchronous rectifiers are switched to rectify the power entering the synchronous rectifiers; however, when the electronic device is inactivated, the synchronous rectifiers does not perform synchronous rectifying procedure. Even if the operation manner of the synchronous rectifier mentioned above is easy, the power provides by the power conversion system is a constant no matter the electronic device during non-light load condition and light load condition, thus the power loss during the electronic device under light load condition is large.

SUMMARY

An embodiment of the present disclosure is related to a power conversion system including a switching module, a resonant module, an integrated power-converting module and an output-controlling device. The integrated power-converting module includes a primary winding, a plurality of power-converting units arranged in a parallel manner and a magnetic core. The each of the power-converting units includes a circuit board having a base portion and an expending portion connected to the base portion, a penetrating hole formed on the expending portion, a secondary winding disposed on the expending portion, and a synchronous rectifying units disposed on the base portion. The output-controlling device includes a controller and a plurality of output-controlling modules electrically connected to the controller, wherein each of the power-converting units is electrically connected to each of the output-controlling modules.

Another embodiment of the present disclosure is related to a power conversion system including a switch module, a resonant module, a magnetic conversion module, a bobbin and an iron core. The magnetic conversion module includes a primary winding and a PCB winding module. The PCB winding module includes a printed circuit board, a conductive layer disposed on at least one surface of the printed circuit board, and a switch unit disposed on the printed circuit board.

BRIEF DESCRIPTION OF THE DRAWINGS

The invention can be more fully understood by reading the following detailed description of the embodiment, with reference made to the accompanying drawings as follows:

FIG. 30 to FIG. 36 illustrate a voltage conversion module according to another embodiment of the present invention.

DETAILED DESCRIPTION

Figure 1:
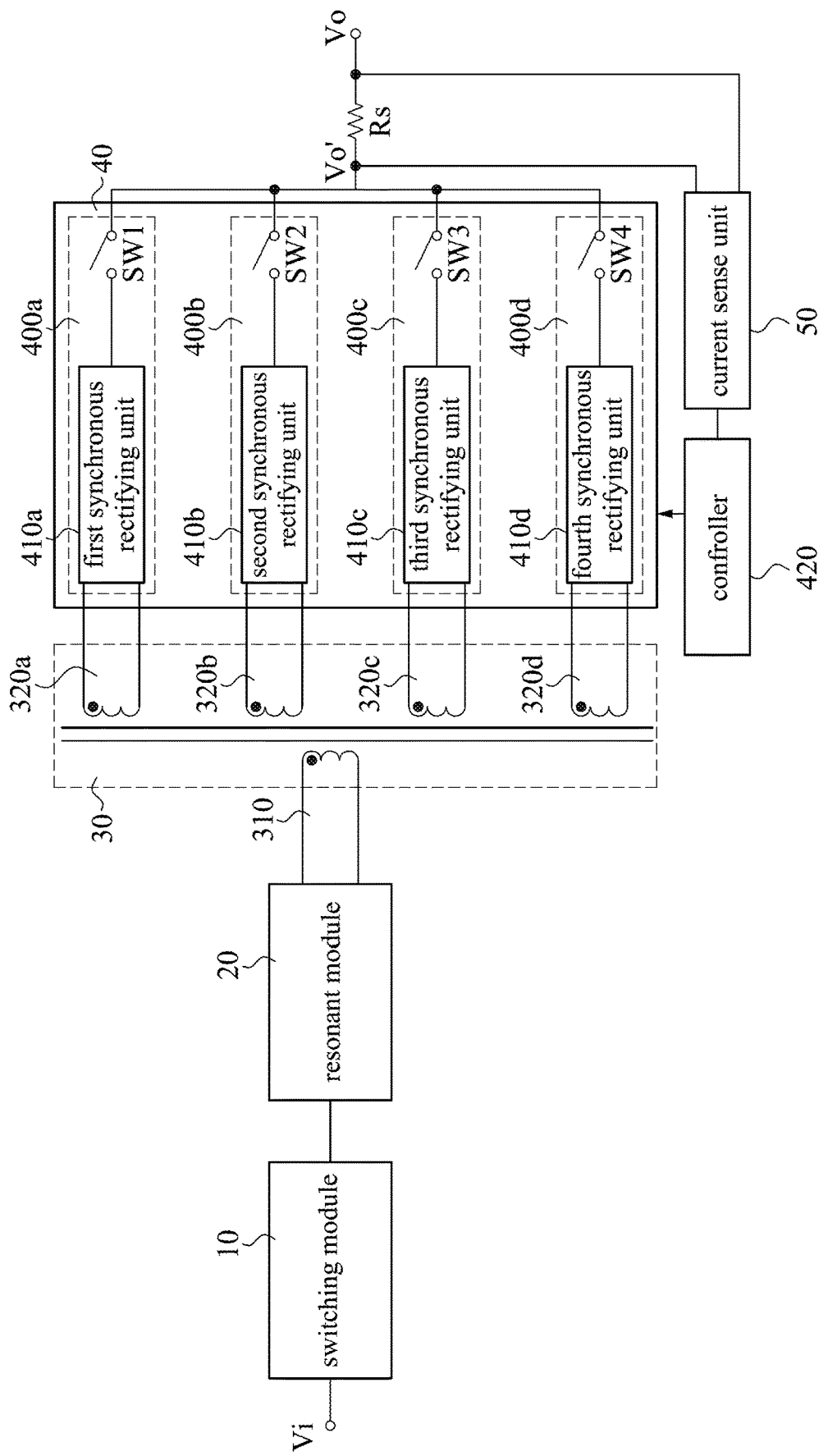
FIG. 1 is a circuit block diagram of a power conversion system according to a first embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference is made to FIG. 1, which is a circuit block diagram of a power conversion system according to a first embodiment of the present disclosure. In FIG. 1, the power conversion system (its reference numeral is omitted) receives an input voltage Vi and is configured to provide an output voltages Vo. The power conversion system includes a primary side and a secondary side, which are separated by an isolating transformer 30. The isolating transformer 30 includes a primary winding 310 and a plurality of secondary windings 320 $a$~320 $d$ magnetically coupled to the primary winding 310. The power conversion system further includes a switching module 10, a resonant module 20, an output-controlling device 40, and a current sense unit 50. The switching module 10, the resonant module 20, and the primary winding 310 are arranged at the primary side of the power conversion system, and the secondary windings 320 $a$~320 $d$, the output-controlling device 40, and the current sense unit 50 are arranged at the secondary side of the power conversion system. The output-controlling device 40 includes a plurality of output-controlling modules 400 $a$~400 $d$, and the controlling modules 400 $a$~400 $d$ include a plurality of synchronous rectifying units (details are described in the following paragraphs) and a plurality of output switches (details are described in the following paragraphs). The current sense unit 50 senses a current flowing through a sensing resistor Rs electrically connected to the output-controlling unit 40 and sends a current sensed signal to the controller 420 for controlling the operation of the output-controlling unit 40.

Figure 2:
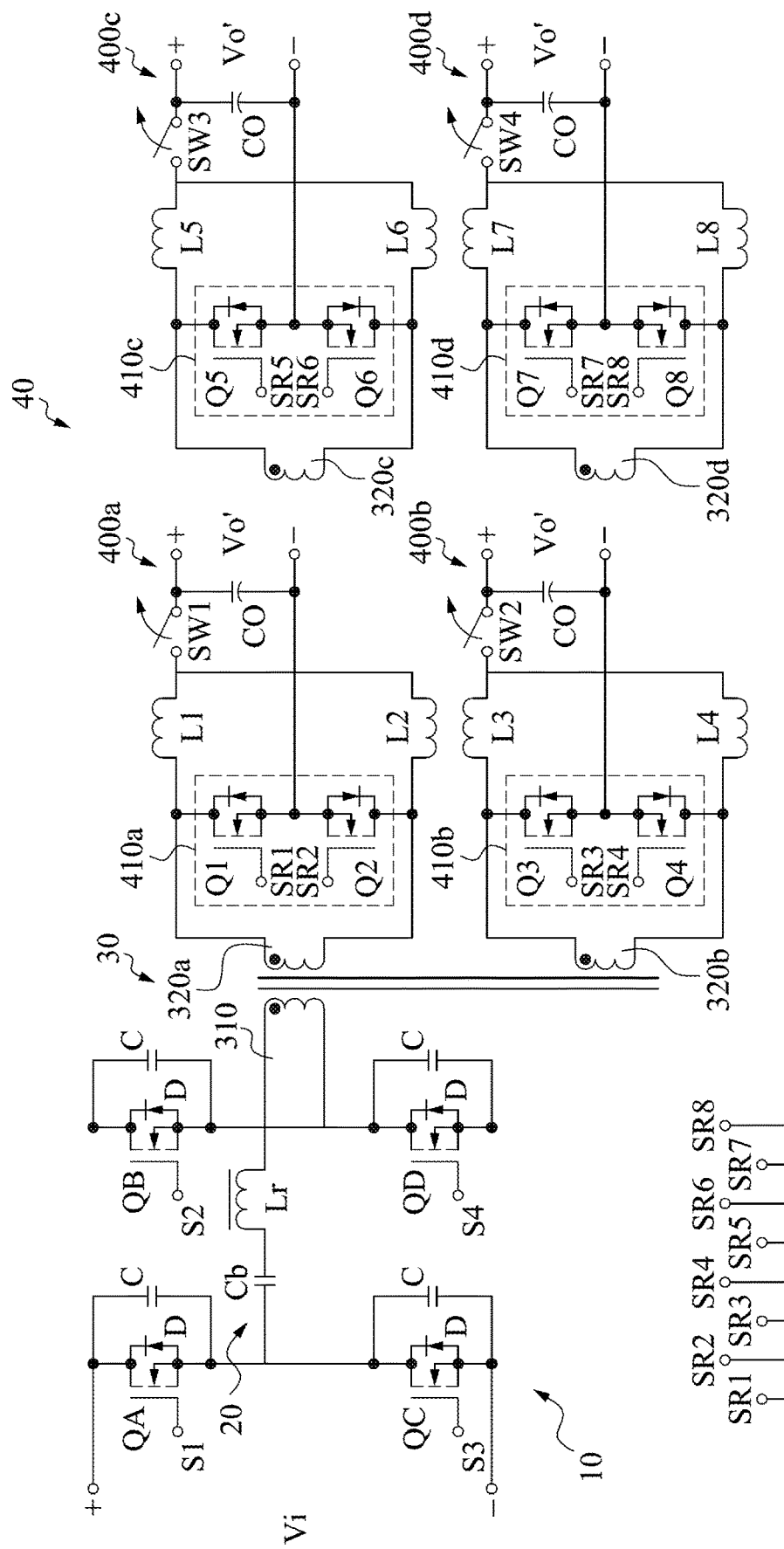
FIG. 2 is a circuit diagram of the power conversion system according to the first embodiment of the present disclosure.

Reference is made to FIG. 2, which is a circuit diagram of a power conversion system according to the first embodiment of the present disclosure. The switching module 10 is electrically connected to the input voltage Vi and includes a first power switch QA, a second power switch QB, a third power switch QC, and a fourth power switch QD. The first to fourth switches QA~QD are, for example, metal-oxide-semiconductor field-effect transistors (MOSFETs). The drains of the first power switch QA and the third power switch QC are connected to the input voltage Vi, the source of the first power switch QA is connected to the drain of the second power switch QB, and the source of the third power switch QC is connected to the drain of the fourth power switch QD and the primary winding 310. The sources of the second power switch QB and the fourth power switch QD are connected to the input voltage Vi.

The switching module 10 may further includes a plurality of diodes D and a plurality of capacitors C electrically connected to the first to fourth power switches QA~QD. Specifically, the diodes D are, for example, the body diodes of the first to fourth power switches QA~QD, and the capacitors C are, for example, parasitic capacitances of the first to fourth power switches QA~QD; the cathode of each diode D is connected to the drain of one of the first to fourth power switches QA~QD, the anode thereof is connected to the source of one of the first to fourth power switches QA~QD, and each of the capacitors C is electrically connected to one of the diodes D in parallel.

The resonant module 20 includes a resonant inductor Lr, a direct-current (DC) isolating capacitor Cb, and a magnetizing inductor. In FIG. 2, the resonant inductor Lr and the isolating transformer 30 are shown integrally; nevertheless, they are able to be separated in the practical manufacturing process. The DC isolating capacitor Cb, the resonant inductor Lr, and the primary winding 310 are electrically connected in series. specifically, one terminal of the DC isolating capacitor Cb is connected to the sources of the first power switch QA and second power switch QB, and the other terminal of the DC isolating capacitor Cb is connected to one terminal of the resonant inductor Lr, and the other terminal of the resonant indictor Lr is connected to the primary winding 310.

The first to fourth power switches QA~QD of the resonant module 20 are controlled using a zero-voltage-switching (ZVS) scheme to reduce switching loss.

The output-controlling device 40 includes a first synchronous rectifying unit 410 $a$, a second synchronous rectifying unit 410 $b$, a third synchronous rectifying unit 410 $s$, a fourth synchronous rectifying unit 410 $d$, a first output switch SW1, a second output switch SW2, a third output switch SW3, and a fourth power switch SW4. The first synchronous rectifying unit 410 $a$ is connected to the secondary winding 320 $a$ and the first output switch SW1, the second synchronous rectifying unit 410 $b$ is electrically connected to the secondary winding 320 $b$ and the second output switch SW2, the third synchronous rectifying unit 410 $c$ is electrically connected to the secondary winding 320 $c$ and the third output switch SW3, and the fourth synchronous rectifying unit 410 $d$ is electrically connected to the secondary winding 320 $d$ and the fourth output switch SW4.

The first synchronous rectifying unit 410 $a$ includes rectifying switches Q1 and Q2, the second synchronous rectifying unit 410 *b* includes rectifying switches Q3 and Q4, the third synchronous rectifying unit 410 *c* includes rectifying switches Q5 and Q6, and the fourth synchronous rectifying unit 410 *d* includes rectifying switches Q7 and Q8. The rectifying switches Q1 to Q8 are, for example, MOSFETs.

The source of the rectifying switch Q1 is connected to the source of the rectifying switch Q2, and the drains of the rectifying switches Q1 and Q2 are respectively connected to the secondary winding 320 *a* (the drain of the rectifying switch Q1 is connected to one terminal of the secondary winding 320 *a*, and the drain of the rectifying switch Q2 is connected to the other terminal of the secondary winding 320 *a*). The source of the rectifying switch Q3 is connected to the source of the rectifying switch Q4, and the drains of the rectifying switches Q3 and Q4 are respectively connected to the secondary winding 320 *b*. The source of the rectifying switch Q5 is connected to the source of the rectifying switch Q6, and the drains of the rectifying switches Q5 and Q6 are respectively connected to the secondary winding 320 *c*. The source of the rectifying switch Q7 is connected to the source of the rectifying switch Q8, and the drains of the rectifying switches Q7 and Q8 are respectively connected to the secondary winding 320 *d*. The gates SR1~SR8 of the rectifying switches Q1~Q8 are electrically connected to the controller 420, and the rectifying switches Q1~Q8 are controlled by the controller 420 using a synchronous rectifying scheme.

The power conversion system further includes filters L1~L8, which are, for example, chokes. The filters L1 and L2 are arranged between the secondary winging 320 *a* and the first output switch SW1, the filter L3 and L4 are arranged between the secondary winding 320 *b* and the second output switch SW2, the filter L5 and L6 are arranged between the secondary winding 320 *c* and the third output switch SW3, and the filter L7 and L8 are arranged between the secondary winding 320 *d* and the fourth output switch SW4. Specifically, each secondary winding 320 *a*~320 *d* has two terminals, one terminal of the secondary winding 320 *a* is connected to the filter L1, and the other terminal thereof is connected to the filter L2; one terminal of the secondary winding 320 *b* is connected to the filter L3, and the other terminal thereof is connected to the filter L4; one terminal of the secondary winding 320 *c* is connected to the filter L5, and the other terminal thereof is connected to the filter L6; one terminal of the secondary winding 320 *d* is connected to the filter L7, and the other terminal thereof is connected to the filter L8.

The power conversion system still further includes a plurality of output capacitors Co. One terminal of the output capacitor is connected to synchronous rectifying unit 410 *a*~410 *d*, and the other terminal thereof is connected to one of the first to fourth output switch SW1~SW4.

It should be noted that the power conversion system is configured to provide different powers to meet the power required for the electronic device. Therefore, the controller 420 may measure the power required for the electronic device by the current sensed signal representing the current flowing through the sensing resistor Rs sent from the current sense unit 50 and place at least one of the synchronous rectifying units 410 *a*~410 *d* or at least one of the first to fourth output switch SW1~SW4 in a conducting state to conduct the power required for the electronic device to the electronic device. It should be noted that when the synchronous rectifying 410 *a*~410 *d* are in the conducting state, the powers coupled to the secondary winding 320 *a*~320 *d* are conducted to the synchronous rectifying units 410 *a*~410 *d*, and a synchronous rectifying procedure is performed. On the contrary, when the synchronous rectifying units 410 *a*~410 *d* are not in the conducting state (or called the synchronous rectifying units 410 *a*~410 *d* are in a non-conducting state), the power transmitted to the primary winding 310 cannot conducted to the secondary windings 320 *a*~320 *d*, and the synchronous rectifying procedure is not performed. Besides, when the first to fourth output switches SW1~SW4 are in the conducting state, the first to fourth output switches SW1~SW4 turn on (close), the powers with synchronous rectification are conducted to the output capacitors Co and the output Vo. One the contrary, when the first to fourth output switches SW1~SW4 are in the non-conducting state, the first to fourth output switches SW1~SW4 turn off (open), the powers with synchronous rectification cannot be conducted to the output capacitors Co and the output Vo.

The isolating transformer 30 and the resonant inductor Lr (if exist) provide a leakage inductance. In order to achieve higher efficiencies and lower electromagnetic interferences (EMI), a zero voltage switching (ZVS) mode is operated. With ZVS mode, during operation, the first to fourth power switches QA~QD in a switching stage of the power conversion system are activated at zero crossings of their main terminal voltage to minimize turn on losses. An amount of time is required by the first to fourth power switches QA~QD to turn off (open) and on (close). The overlap between these transitions can be referred to as dead-time (as time points between t2 and t3 and the time points between t4 and t5 shown in the FIG. 4*a*). A minimum amount of dead-time is needed to avoid having the first power switch QA and second power switch QB (or the third power switch QC and the fourth power switch QD) closed (turned on) at the same time. If the first power switch QA and the second power switch QB (or the third power switch QC and the fourth power switch QD) are closed at the same time, potentially destructive shoot-through current that travels directly from input voltage Vi to electronic device may result. The period of the dead-time is rises gradually as leakage inductance is increased. The gates of the first to fourth power switches QA~QD are electrically connected to a controlling circuit (not shown), and the first to fourth power switches QA~QD are turned off and on according to signals sent from the controlling circuit.

Figure 4A:
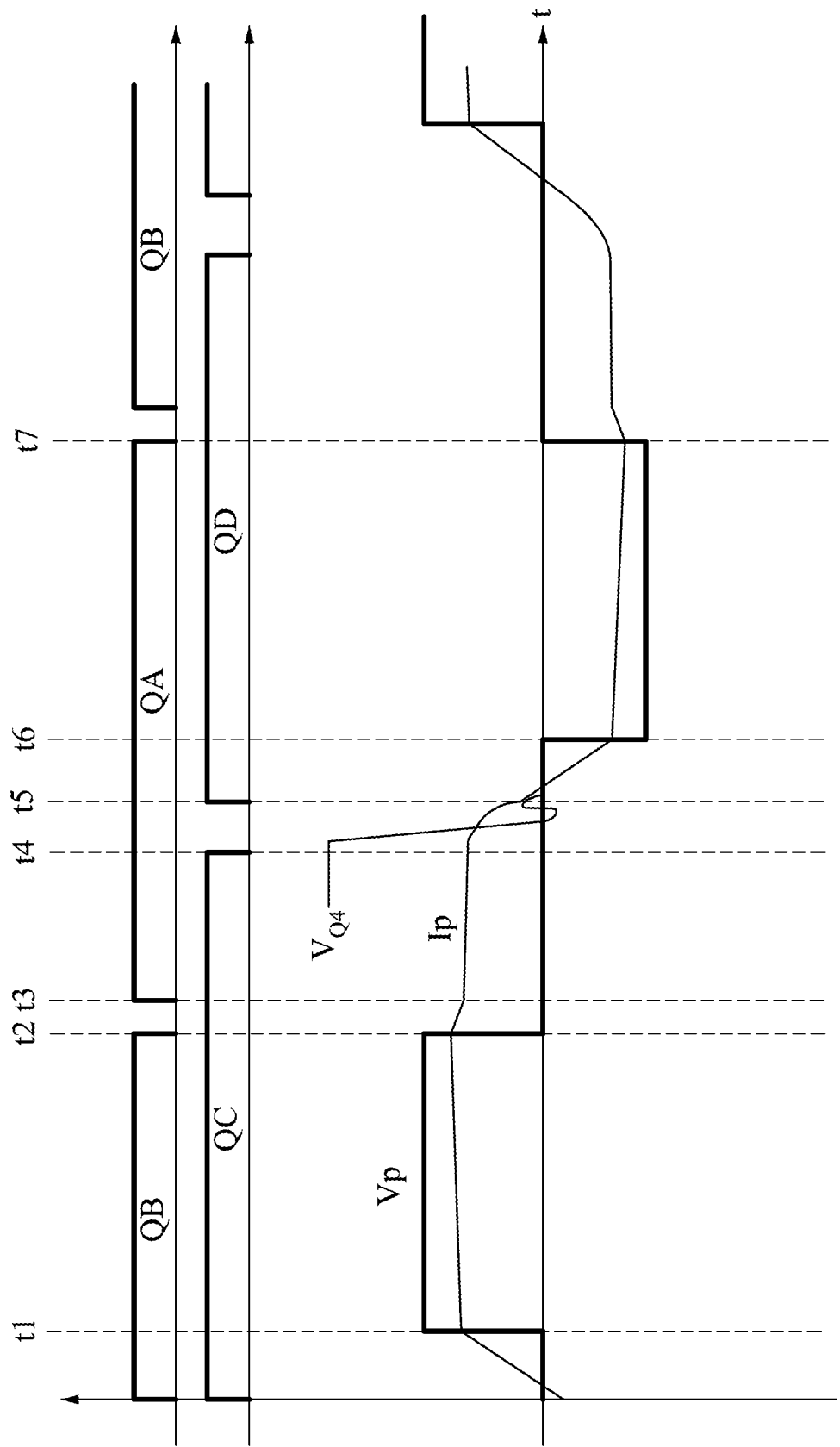
FIGS. 4a and 4b are timing charts indicating operations of the power conversion system during light load condition.

Reference is made to FIG. 2 and FIG. 4*a*, wherein FIG. 4*a* is a timing chart indicating operations of the power conversion system during light load condition. In order to clarify detailed operation of the power conversion system of the present disclosure, the following example is given. It should be noted that the values given in the example are only for clarity. The values can be changed to meet system requirements. During the heavy load condition, the power (including voltage and current) provided by the power conversion system is the largest. As the load lightens, the power is reduced. During the light load condition, the power provided by the power conversion system reduces to, for example, 20%; during the normal load condition, the power provided by the power conversion system reduces to, for example, 50%.

Seven time points t1-t7 are shown in the FIG. 4*a*. With the second power switch QB and the third power switch QC are closed (placed in conducting states) (wherein the first power switch QA and the fourth power switch QD are opened) to provide a conduction path between time points t1 and t2, a primary current Ip from the input voltage Vi flows through the third power switch QC, the primary winding 310, the resonant module 20, the second power switch QB to the ground. During this time, energy is stored in the resonant inductor Lr, and the primary current (Ip) is raised.

The second power switch QB is then opened at time point t2 (the third power switch QC is continuously closed), and then a short time duration later, the first power switch QA is closed (at time point t3). During this short duration, the current supported by the energy stored in the isolating transformer's leakage inductance, and optionally in resonant inductor Lr, now flows out of the capacitances C associated with the first power switch QA and the second power switch QB and into the third power switch QC (which is still closed). Specifically, when the second power switch QB is opened, the primary current Ip freewheels through the diode D associate with the first power switch QA, and the capacitor C associated with the second power switch QB is charged, and the capacitor C associated with the first power switch QA is discharged until the potential of the capacitor C associates with the second power switch QB is equal to that of the input voltage Vi.

When a voltage across drain-source of the first power switch QA is lower than a voltage across the forward bias of the diode D associated with the first power switch QA, the diode D associate with the first power switch QA turns on (placed in conducting states). As such, the first power switch QA is closed under zero-voltage condition (i.e., zero voltage switching). Due to that the voltage across drain-source of the first power switch QA is lower than the voltage across the diode D associate with the first power switch QA, the conduction loss is low. At this time, the primary voltage Vp of the power conversion system is zero.

Between time points t4 and t5, the third power switch QC is closed and the current freewheels through the diode D associated with the fourth power switch QD. During this short duration, the current supported by the energy stored in the isolating transformer's leakage inductance, and optionally in resonant inductor Lr, now flows out of the capacitances C associated with the third power switch QC and the fourth power switch QD and into the first power switch QA (which is still closed). Specifically, when the third power switch QC is opened, the primary current Ip freewheels through the diode D associate with the fourth power switch QD, and the capacitor C associated with the third power switch QC is charged, and the capacitor C associated with the fourth power switch QD is discharged until the potential of the capacitor C associates with the third power switch QC is equal to that of the input voltage Vi and a voltage across drain-source of the second power switch QD is dropped to zero (as curve VQ4 shown).

When a voltage across drain-source of the fourth power switch QD is lower than a voltage across the forward bias of the diode D associated with the fourth power switch QD, the diode D associate with the fourth power switch QD turns on (placed in conducting states). As such, the fourth power switch QD is closed under zero-voltage condition.

Due to the voltage across the resonant inductor Lr is equal to the input voltage Vi, the primary current Ip is linearly decreased between time points t5 and t6. In FIG. 4a, a duty cycle loss appears between time points t5 and t6 since a primary voltage Vp does not drop to negative value at time point t5, which the fourth power switch QD is closed (wherein the fourth power switch QD is closed at time point t6). The more the leakage inductance is, the more duty cycle loss is, and the duty cycle loss is given by $$Lr*(Ip/Vp)$$

wherein
Lr is the inductance of the resonant inductor;
Ip is the primary current of the power conversion system; and
Vp is the primary voltage of the power conversion system.

Figure 5A:
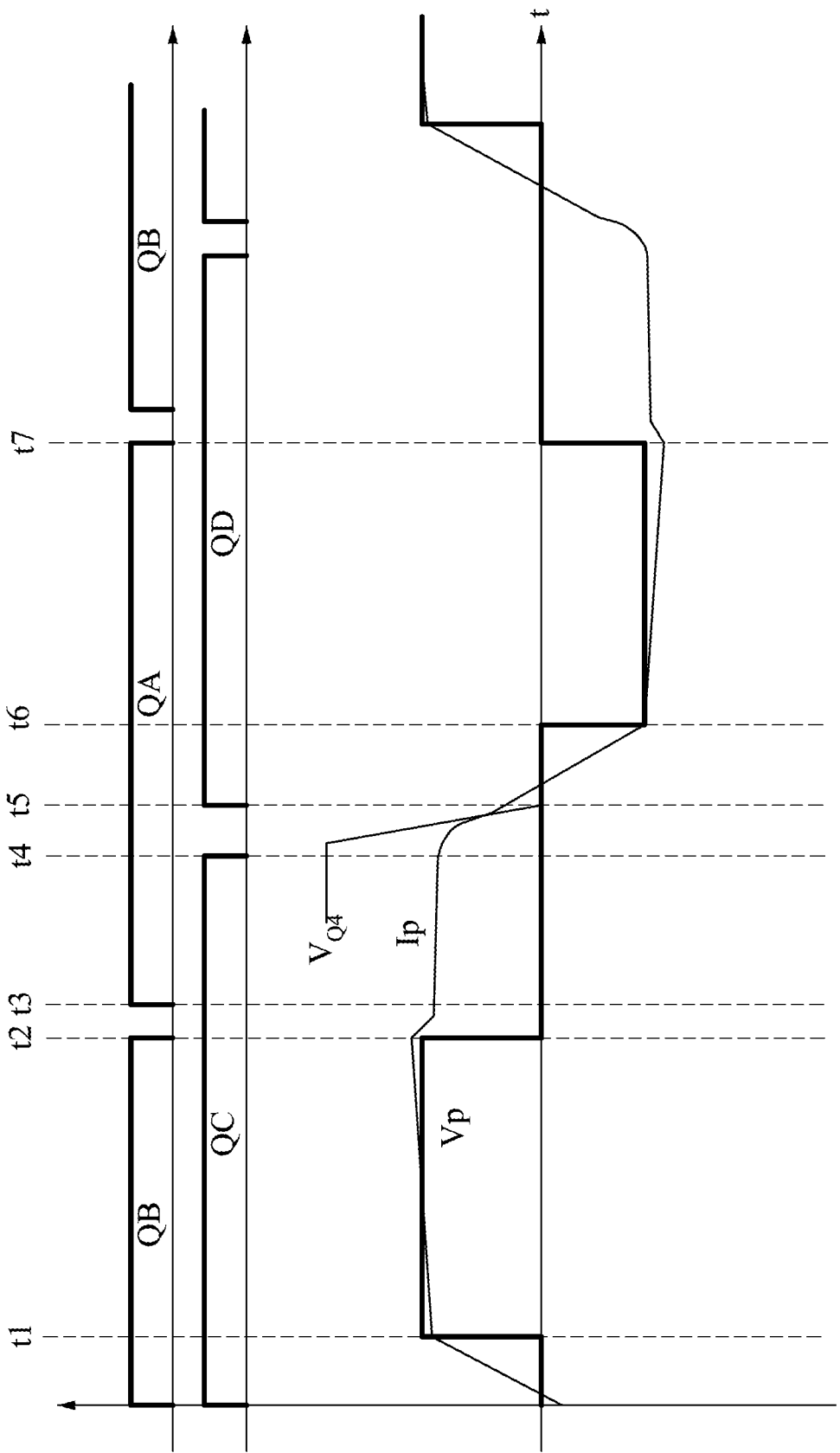
FIGS. 5a and 5b are timing charts indicating operations of the power conversion system during normal load condition.
Figure 6A:
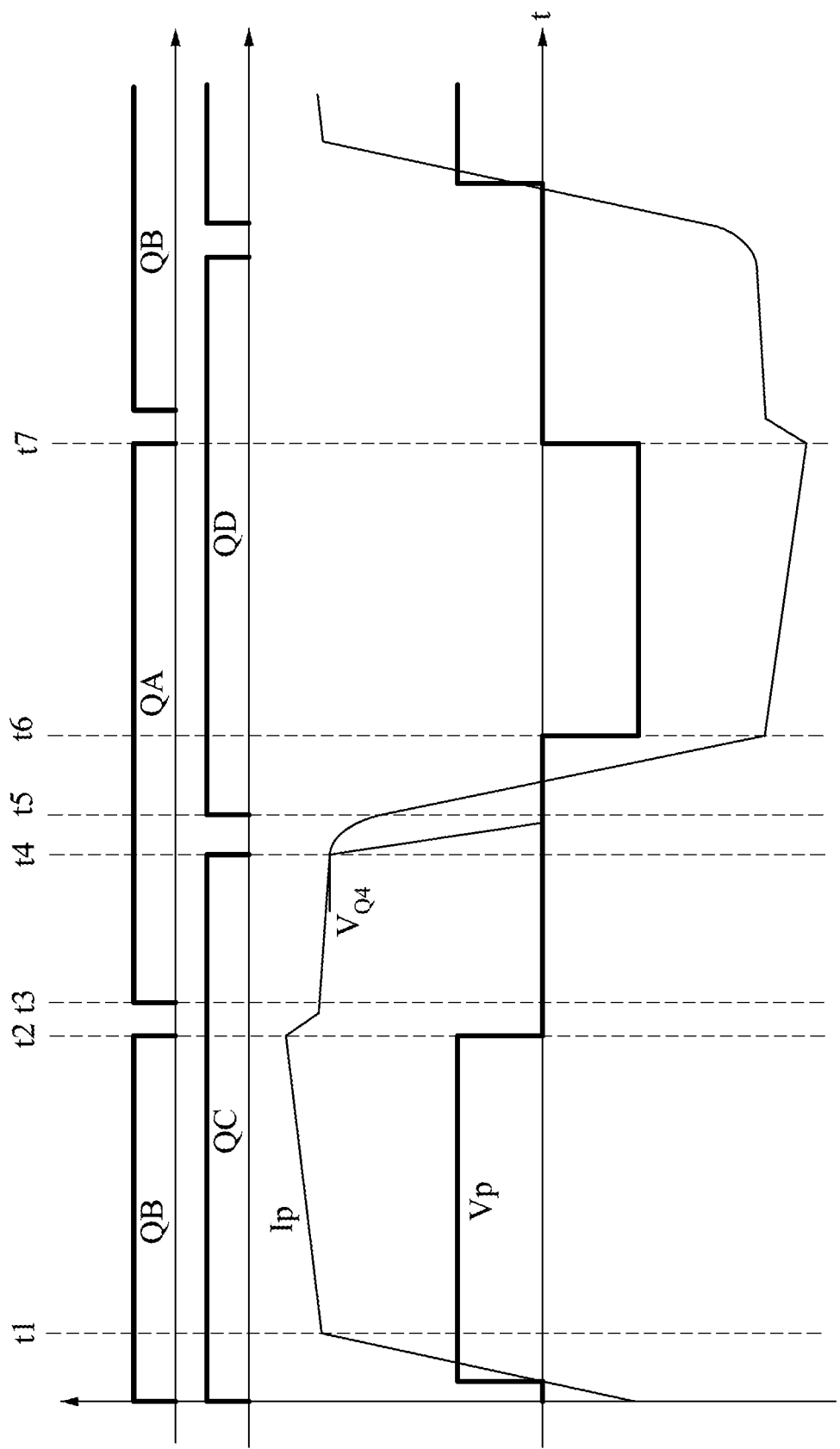
FIGS. 6a and 6b are timing charts indicating operations of the power conversion system during heavy load condition.

FIG. 5a is a timing chart indicating operations of the power conversion system during normal load condition. FIG. 6a is a timing chart indicating operations of the power conversion system during heavy load condition. The function and relative description of the power conversion system during normal load condition and during heavy load condition are the same as that of during light load condition mentioned above and are not repeated here for brevity. It should be noted that the current provided by the power conversion system is increased while the power (current) required for the electronic device is increased, and the duty cycle loss of the power conversion system is increased while the current provided by the power conversion system is increased. As such, a hold-up time depends upon the duty cycle loss is then decreased, that result in lower efficiency. Specifically, if the input voltage Vi falls below the minimum permissible voltage and adversely affects the power conversion system operation, the electronic devices that rely on the power conversion system for power could experience critical failures such as the loss of data. The length of time that the power conversion system can continue to operate in the absence of line voltage is referred to as the hold-up time.

If power conversion system is to provide a better efficiency, then a lower duty cycle loss will be needed. As a result, a distinctive operation of the output-controlling device 40 is required to meet the duty cycle loss required to keep the efficiency of the power conversion system within acceptable limits.

In general, the power provided by the power conversion system depends upon the power required for the electronic device. More particularly, the power required for the electronic device during heavy load condition is higher than that of during the light load condition. Therefore, the power (such as current) provided by the power conversion system while the electronic device operated under heavy load condition will be higher than that of operated under light load condition.

The output-controlling device 40 of the present disclosure is controlled to make the current provided by the power conversion system to meet the power required for the electronic device.

Figure 3:
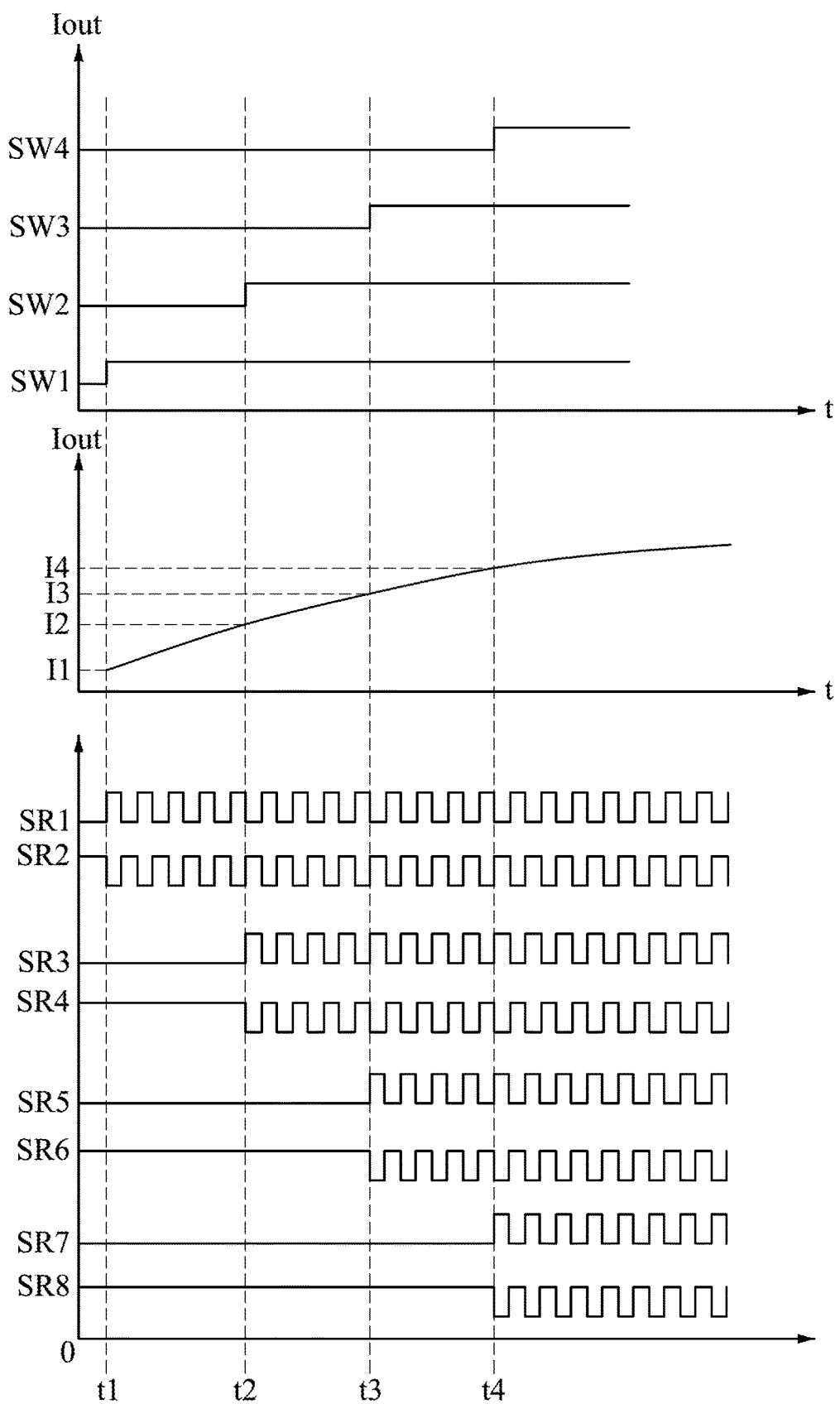
FIG. 3 is a timing chart indicating the operations of power switches and rectifying switches shown in FIG. 2.

The power conversion system may provide the power to meet the required for the electronic device depends upon the operation of the first to fourth synchronous rectifying units 410 a~410 d of the output-controlling module 400 a~400 d. Reference is made back to FIG. 2 and FIG. 3. In first operation state, when a first current I1 is required for the electronic device, the controller 420 sends signals to gates SR1~SR8 of the rectifying switches Q1~Q8 according to the current sensed signal sent from the current sense unit 50 for indicating that the first current I1 is required by the electronic device, and places one of the first to fourth rectifying unit 410 a~410 d in the conducting state for performing synchronous rectifying procedure, thus the first current I1 is provided by the power conversion system. Specifically, the controller 420 may send pulsating signals to drive the rectifying switches Q1 and Q2 to interleaved turn off and on (as time points between 0~t1 shown in FIG. 3), thus a power coupled to the secondary winding 320 a is synchronous rectified by the first synchronous rectifying unit 410 a and the rectified power is then conducted to the output terminal (connected to the electronic device) by passing through the filters L1 and L2, the first output switch SW1, and the output capacitor Co connected to the first output switch SW1.

In second operation state, when a second current I2 is required for the electronic device, the controller 420 receives the current signal sent from the current sense unit for indicating that the second current I2 is required by the electronic device, and sends signals to the gates SR1~SR8 for placing two of the first to fourth synchronous rectifying units 410 a~410 d in the conducting state for performing synchronous rectifying procedure, thus the second current I2 is then provided by the power conversion system, the second current I2 is larger than the first current I1. Specifically, the controller 420 may send pulsating signals to drive the rectifying switches Q1~Q4 to interleaved turn off and on (as time points between t1 and t2 shown in FIG. 3), thus powers coupled to the secondary winding 320 a and 320 b are synchronous rectified by the first and second synchronous rectifying units 410 a and the 410 b, respectively, and the rectified powers are then conducted to the output terminal (connected to the electronic device) by passing through the filters L1~L4, the first power switch SW1, second output switch SW2, and the output capacitors Co connected to the first power switch SW1 and the second output switch SW2.

In third operation state, when a third current I3 is required for the electronic device, the controller 420 receives the current sensed signal sent from the current sense unit 50 for indicting that the third current is required for the electronic device, and sends signals the gates SR1~SR8 for placing three of the first to fourth synchronous rectifying unit 410 a~410 d in the conducting state for performing synchronous rectifying procedure, thus the third current I3 is then provided by the power conversion system, the third current I3 is larger than the second current I2. Specifically, the controller 420 may send pulsating signals to drive the rectifying switches Q1~Q6 to interleaved turn off and on (as time points between t2 and t3 shown in FIG. 3), thus powers coupled to the secondary windings 320 a~320 c are synchronous rectified by the first to third synchronous rectifying units 410 a~410 c, respectively, and the rectified powers are then conducted to the output terminal (connected to the electronic device) by passing through the filters L1~L6, the first to third output switch SW1~SW3, and the output capacitors Co connected to the first to third output switch SW1~SW3.

In fourth operation state, when a fourth current I4 is required for the electronic device, the controller 420 receives the current sensed signal sent from the current sense unit for indicating that the third current is required for the electronic device, and sends signals to the gates SR1~SR8 for placing all of the first to fourth synchronous rectifying unit 410 a~410 d in the conducting state for perform synchronous rectifying procedure, thus a fourth current I4 is then provided by the power conversion system, the fourth current I4 is larger than the third current I3. Specifically, the controller 420 may sent pulsating signals to drive the rectifying switches Q1~Q8 to interleaved turn on and off continuously (after time point t3 shown in FIG. 3), thus powers coupled to the secondary winding 320 a~320 d are synchronous rectified by the first to fourth synchronous rectifying units, respectively, and the rectified power are then conducted to the output terminal (connected to the electronic device) by passing through the filters L1~L8, the first to fourth output switch SW1~SW4 and the output capacitors Co.

As such, an effect of energy conservation is provided and the power loss while the electronic device operated under light load condition is reduced since the first to the fourth rectifying unit 410 a~410 d are separately placed in the conducting state and driven to synchronous rectify the powers coupled to the secondary windings 320 a~320 d.

The controller 420 may selectively place the first to fourth switches SW1~SW4 in the conducting state for conducting power required for the electronic device to the output terminal. It should be noted when the controller 420 places at least one of the first to fourth synchronous rectifying units 410 a~410 d in the conducting state for conducting power require for the electronic device to the output terminal, the first to fourth switches SW1~SW4 are always closed to make the rectified power(s) flowing therethrough; when the controller 420 places at least one of the first to fourth switch SW1~SW4 in the conducting state for conducting power required for the electronic device to the output terminal, the controller 420 sends the pulsating signals to the rectifying switches Q1~Q8 to makes the first to fourth synchronous rectifying units 410 a~410 d perform synchronous rectifying procedure all the time.

Reference is made back to FIG. 2 and FIG. 3. The controller 420 may place the first switch SW1 in the conducting state for conduct a power coupled to the secondary winding 320 a and rectified by the first synchronous rectifying unit 410 a to the output terminal (connected to the electronic device) in first operation state, therefore the first current I1 is provided to the electronic device (as the time points between 0 and t1 shown in the FIG. 3).

In second operation state, the controller 420 may place the first switch SW1 and the second switch SW2 in the conducting state for conducting powers coupled to the secondary windings 320 a and 320 b and rectified by the first synchronous rectifying unit 410 a and the second synchronous rectifying unit 410 b to the output terminal (connected to the electronic device), therefore the second current I2 is provided to the electronic device (as the time points between t1 and t2 shown in the FIG. 3), wherein the second current I2 is larger than the first current I1.

In third operation state, the controller 420 may place the first to third switches SW1~SW3 in the conducting state for conducting powers coupled to the secondary windings 320 a~320 c and rectified by the first to third synchronous rectifying units 410 a~410 c to the output terminal (connected to the electronic device), therefore the third current I3 is provided to the electronic device (as the time points between t2 and t3 shown in the FIG. 3), wherein the third current I3 is larger than the second current I2.

The controller 420 places the first to fourth switches SW1~SW4 in the conducting state for conducting powers coupled to the secondary windings 320 a~320 d and rectified by the first to fourth synchronous rectifying units 410 a~410 d to the output terminal (connected to the electronic device), therefore the fourth current I4 is provided to the electronic device (as the time point t3 shown in the FIG. 3), wherein the fourth current I4 is larger than the third current I3.

The arrangement of the primary winding 310 and the second windings 320 a~320 d of the present disclosure is further controlled to lower the power loss of the power conversion system.

Figure 7:
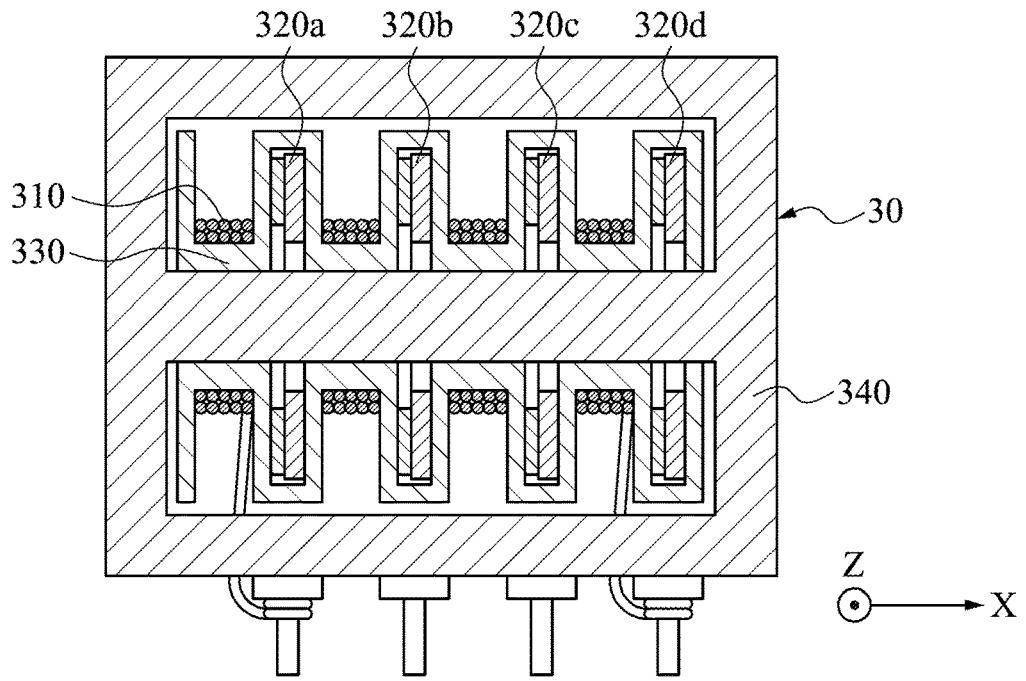
FIG. 7 is a cross sectional view of an isolating transformer according to the first embodiment of the present disclosure.

Reference is made to FIG. 7, which is a cross-sectional view of the isolating transformer according to the first embodiment of the present disclosure. The isolating transformer 30 further includes a bobbin 330 and a magnetic core 340, and the magnetic core 340 is assembled with the bobbin 330. The primary winding 310 and the secondary winding 320 a~320 d are placed on the bobbin 330. In FIG. 7, the isolating transformer 30 includes one primary winding 310 and four secondary windings 320 a~320 d, the secondary windings 320 a~320 d are arranged at the bobbin 330 with equidistance intervals (such as inserted into slots preset on the bobbin 330 with equidistance intervals), the primary winding 310 is wound on the bobbin 330 (where the secondary windings 320 $a$~320 $d$ does not placed and across each of the secondary windings 320 $a$~320 $d$). As a result, the primary winding 310 and the secondary windings 320 $a$~320 $d$ are arranged in a staggered manner in a side view direction, i.e., the primary winding 310 is placed at same side of each secondary winding 320 $a$~320 $d$ (wherein in FIG. 7, the primary winding 310 is wound on the bobbin 310 and placed at the left side of the secondary winding 320 $a$~320 $d$).

Reference is made back to FIG. 2 and FIG. 7, the power conversion system may provide power required for the electronic device by controlling the operation states of the output-controlling modules 400 $a$~400 $d$.

In one of the operation states, the controller 420 may send pulsating signals to drive the rectifying switches Q1~Q8 to perform synchronous rectifying procedure. As a result, the power coupled to the second windings 320 $a$~32 $d$ is synchronously rectified by the first to fourth synchronous rectifying units 410 $a$~410 $d$, and the rectified powers are then conducted to the output terminal (connected to the electronic device) by passing through the conducted first to fourth switches SW1~SW4. Selectively, the controller 420 may drive the first to fourth switches SW1~SW4 to close and then conduct the power coupled to the second windings 320 $a$~320 $d$ and rectified by the first to fourth synchronous rectifying units 410 $a$~410 $d$ to the output terminal (connected to the electronic device). As a result, a leakage inductance based on the magnetic coupling between the primary winding 310, the secondary windings 320 $a$~320 $d$, and optionally in resonant inductor Lr is generated.

Figure 8:
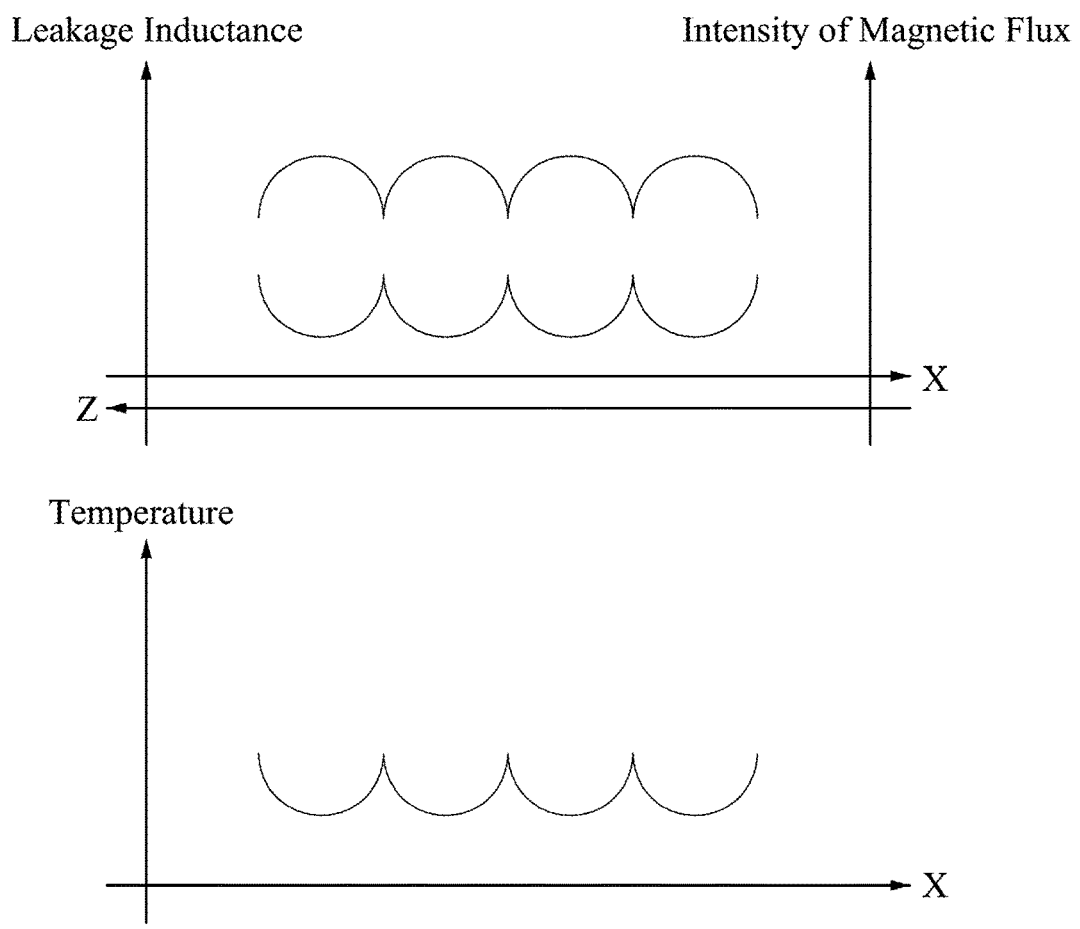
FIG. 8 is a diagram showing the state of leakage inductance, the magnetic flux, and temperature distribution in the isolating transformer shown in the FIG. 7.

Reference is made to FIG. 8, the lowest leakage inductance appears at the points that each of the second windings 320 $a$~320 $d$ is close to the primary winding 310, and the leakage inductance is increased when the coupling distance between each of the secondary windings 320 $a$~320 $d$ and the primary winding 310 is increased. The leakage inductance varies in a fixed range since the primary winding 310 and the secondary windings 320 $a$~320 $d$ are arranged in the staggered manner.

In another operation state, the controller 420 may send pulsating signals to the rectifying switches Q1~Q2 to drive the first synchronous rectifying unit 410 $a$ perform synchronous rectifying procedure (wherein the rectifying switches Q3~Q8 are always opened). As a result, only the power coupled to the second windings 320 $a$ is synchronously rectified by the first synchronous rectifying units 410 $a$, and the rectified power is then conducted to the output terminal (connected to the electronic device) by passing through the conducted first to fourth switches SW1~SW4. Selectively, the controller 420 may drive the first switch SW1 to close and conduct the power coupled to the second windings 320 $a$ and rectified by the first synchronous rectifying units 410 $a$ to the output terminal (connected to the electronic device). Another leakage inductance based on the magnetic coupling between the primary winding 310, the secondary windings 320 $a$, and optionally in resonant inductor Lr is generated.

Figure 9:
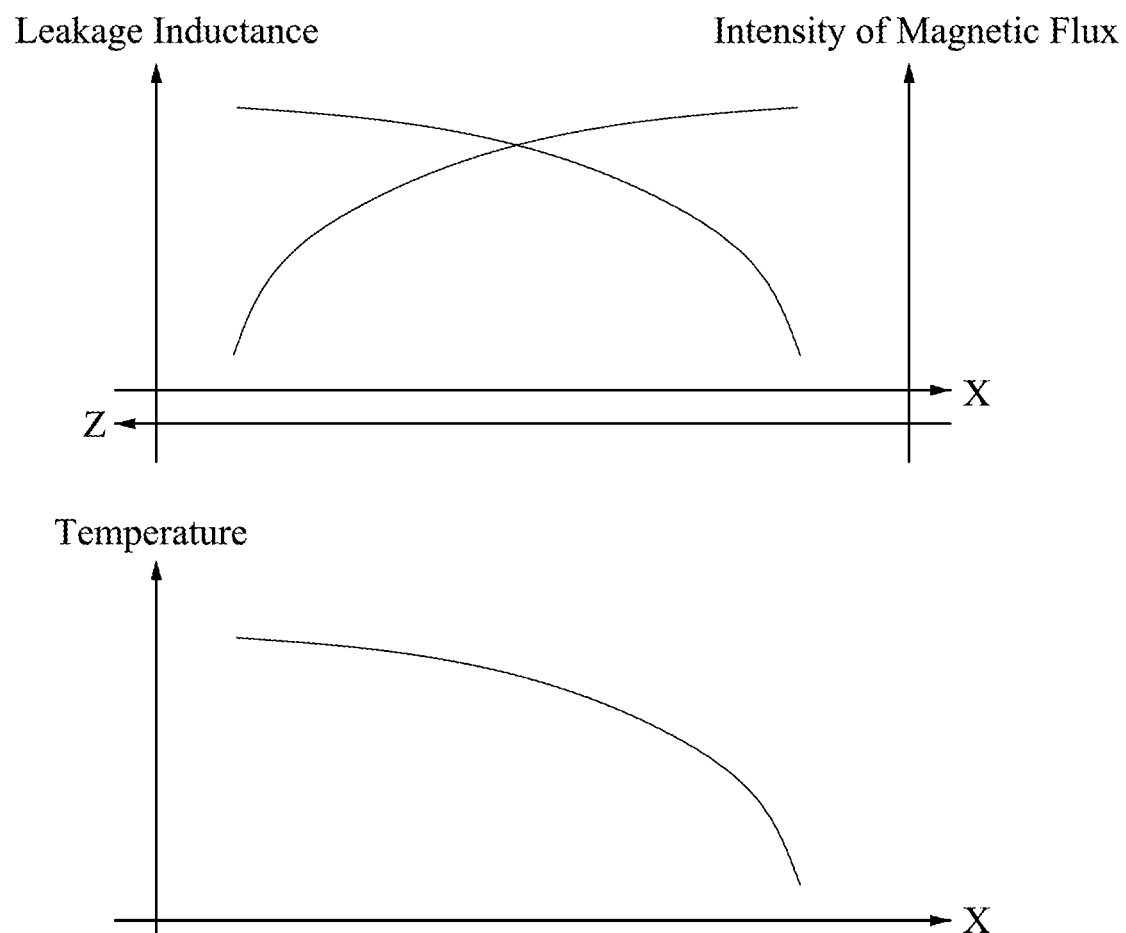
FIG. 9 is a diagram showing the state of leakage inductance, the magnetic flux, and temperature distribution in the isolating transformer shown in the FIG. 7.

Reference is made to FIG. 9, the lowest leakage inductance appears at the point between the second winding 320 $a$ and the primary winding 310, and the leakage inductance is increased when the coupling distance between the secondary winding 320 $a$ and the primary winding 310 is increased.

In the other state, the controller 420 may send pulsating signals to the rectifying switches Q3~Q6 to drive the second synchronous rectifying unit 410 $b$ and the third synchronous rectifying unit 410 $c$ to perform synchronous rectifying procedure (wherein the rectifying switches Q1, Q2, Q7, and Q8 are always opened). As a result, only the powers coupled to the second windings 320 $b$ and 320 $c$ are synchronously rectified by the second synchronous rectifying units 410 $b$ and the third synchronous rectifying units 410 $c$, and the rectified powers are then conducted to the output terminal (connected to the electronic device) by passing through the conducted first to fourth switches SW1~SW4. Selectively, the controller 420 may drive the second switch SW2 and the third switch SW3 to close and conduct the powers coupled to the second windings 320 $b$ and 320 $c$ and rectified by the second synchronous rectifying unit 410 $b$ and the third synchronous rectifying units 410 $c$ to the output terminal (electrically connected to the electronic device). Still another leakage inductance based on the magnetic coupling between the primary winding 310, the secondary windings 320 $b$ and 320 $c$, and optionally in resonant inductor Lr is generated.

Figure 10:
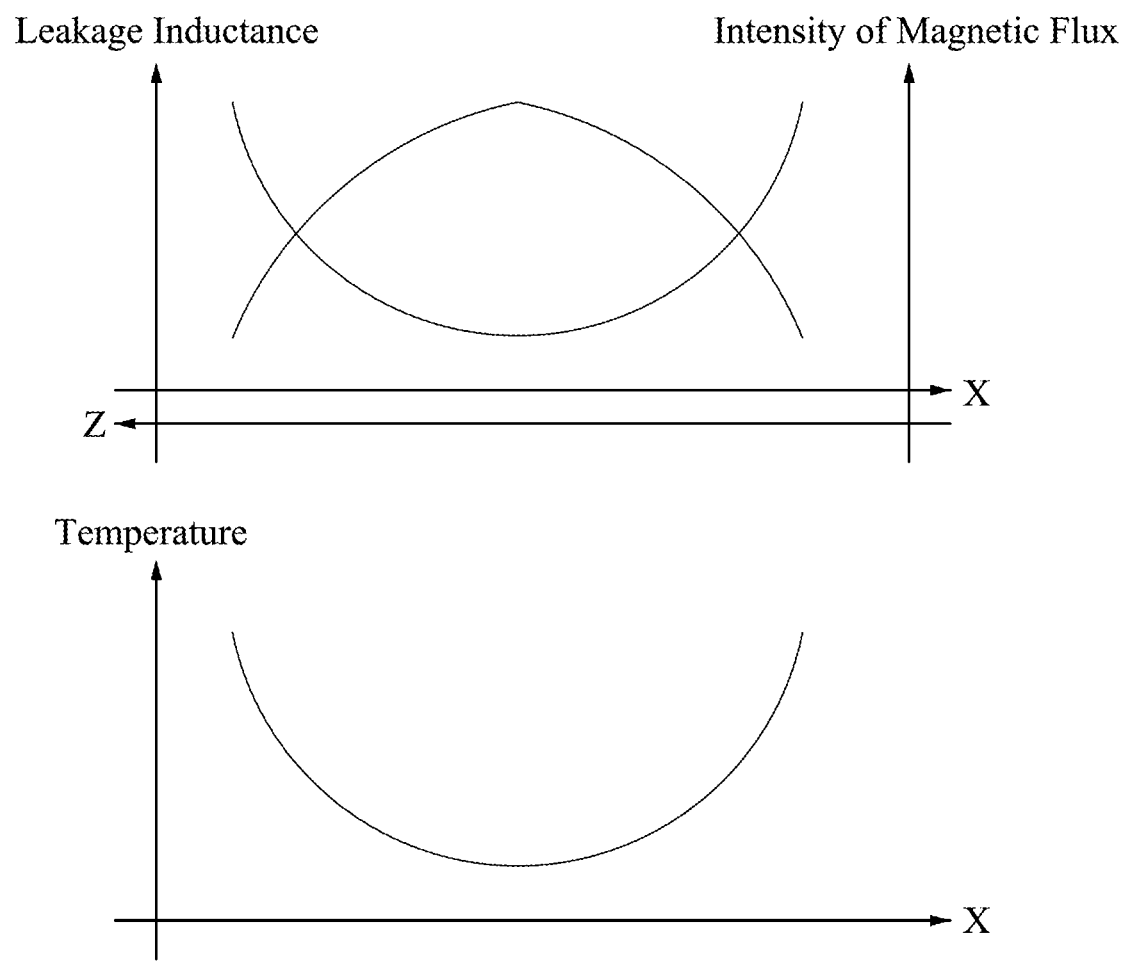
FIG. 10 is a diagram showing the state of leakage inductance, the magnetic flux, and temperature distribution in the isolating transformer shown in the FIG. 7.

Reference is made to FIG. 10, the lowest leakage inductance appears at the point between the second windings 320 $b$, 320 $c$ and the primary winding 310, and the leakage inductance is increased when the coupling distance between the secondary winding 320 $b$, 320 $c$ and the primary winding 310 is increased.

In sum, the amount of the first to fourth synchronous rectifying units 410 $a$~410 $d$ performing synchronous rectifying procedure and the coupling distance between the secondary winding 320 $a$~320 $d$ performing synchronous rectifying and the primary windings 310 affects the leakage inductance of the power converting system. As such, by effectively controlling the amount of the first to fourth synchronous rectifying units 410 $a$~410 $d$ performing synchronous rectifying procedure and the coupling distance mentioned above, the power conversion system can accurately provide power required for the electronic device to the electronic device.

It should be noted that the power conversion system provides power to the electronic device only when the synchronous rectifying unit (410 $a$~410 $d$) connected to the particular secondary winding (320 $a$~320 $d$) performs synchronous rectifying procedure and the output switch (SW1~SW4) connected to the synchronous rectifying (410 $a$~410 $d$) is close. For example, reference is made to FIG. 2, when the first synchronous rectifying unit 410 $a$ performs synchronous rectifying procedure and the first switch SW1 is close, the power conducted to the primary winding 310 is coupled to the secondary winding 320 $a$ connected to the first synchronous rectifying unit 410 $a$, and then the rectified power is conducted to the electronic device by passing through the filters L1 and L2. In the meanwhile, a leakage inductance based on the magnetic coupling between the primary winding 310 and the secondary windings 320 $a$~320 $d$ is generated.

The detail data of the leakage inductance in different operation states are shown in Table 1.

TABLE 1

| | 1st synchronous rectifying unit | 2nd synchronous rectifying unit | 3rd synchronous rectifying unit | 4th synchronous rectifying unit | Leakage inductance (μH) |
|---|---|---|---|---|---|
| 1st state | non-conducting state | non-conducting state | non-conducting state | conducting state | 25.19 |

TABLE 1-continued

| | 1st synchronous rectifying unit | 2nd synchronous rectifying unit | 3rd synchronous rectifying unit | 4th synchronous rectifying unit | Leakage inductance (μH) |
|---|---|---|---|---|---|
| 2nd state | conducting state | non-conducting state | non-conducting state | non-conducting state | 24.4 |
| 3rd state | conducting state | non-conducting state | non-conducting state | conducting state | 14.59 |
| 4th state | non-conducting state | non-conducting state | conducting state | non-conducting state | 12.3 |
| 5th state | non-conducting state | conducting state | non-conducting state | non-conducting state | 12.2 |
| 6th state | non-conducting state | non-conducting state | conducting state | conducting state | 11.93 |
| 7th state | conducting state | conducting state | non-conducting state | non-conducting state | 10.13 |
| 8th state | conducting state | non-conducting state | conducting state | conducting state | 9.95 |
| 9th state | conducting state | non-conducting state | conducting state | non-conducting state | 9.9 |
| 10th state | non-conducting state | conducting state | non-conducting state | conducting state | 9.89 |
| 11th state | conducting state | conducting state | non-conducting state | conducting state | 8.29 |
| 12th state | conducting state | conducting state | conducting state | non-conducting state | 8.2 |
| 13th state | non-conducting state | conducting state | conducting state | conducting state | 8.12 |
| 14th state | conducting state | conducting state | conducting state | conducting state | 8.02 |
| 15th state | non-conducting state | conducting state | conducting state | non-conducting state | 8 |

In Table 1, "conducting state" means that the synchronous rectifying unit (410 $a$~410 $d$) is places in the conducting state and performs synchronous rectifying procedure, thus the power conducted to the primary winding 310 may be coupled to particular secondary winding (320 $a$~320 $d$) connected to the synchronous rectifying unit (410 $a$~410 $d$) placed in the conducting state, and a rectified power is then conducted to the electronic device; nevertheless, "non-conducting state" means that the synchronous rectifying unit 410 $a$~410 $d$ is places in the non-conducting state and does not perform synchronous rectifying procedure, and the power conducted to the primary winding 310 does not coupled to the secondary winding 320 $a$~320 $d$ connected to the synchronous rectifying unit 410 $a$~410 $d$ placed in the non-conducting state.

Figure 4B:
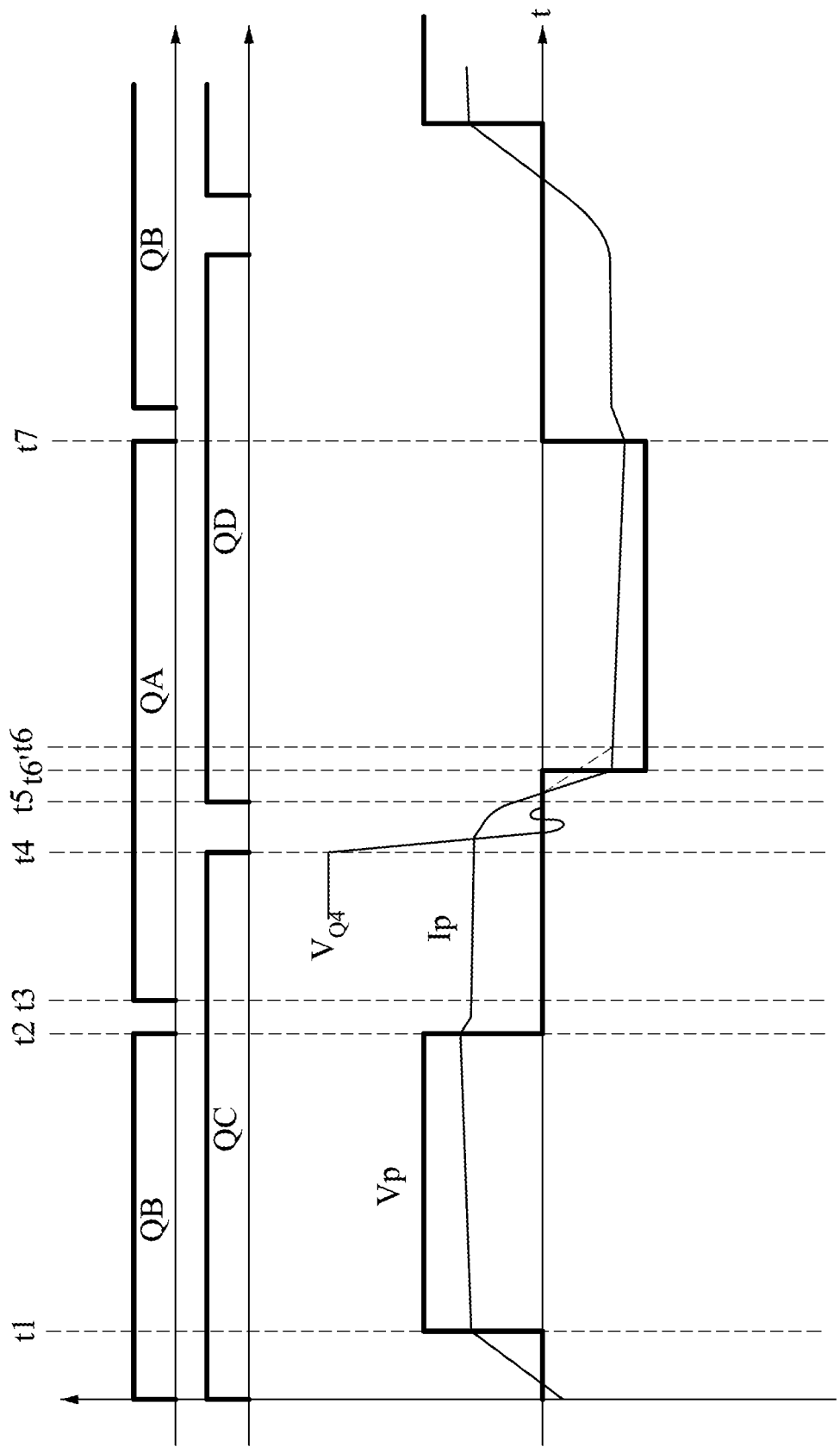

Reference is made to FIG. 4$b$, which is another timing chart indicating operations of the power conversion system during light load condition. It should be noted that the timing chart shown in the FIG. 4$b$ indicates the power conversion system which the amount of the first to fourth synchronous rectifying units 410 $a$~410 $d$ performing synchronous rectifying procedure and the coupling distance between the secondary winding 320 $a$~320 $d$ connected to the first to fourth synchronous rectifying units 410 $a$~410 $d$ performing synchronous rectifying procedure and the primary windings 310 are controlled as mentioned above. In FIG. 4$b$, a duty cycle loss appears between time points t5 and t6' since a primary voltage Vp does not drop to negative value at time point t5, which the fourth power switch QD is closed. Comparing to the FIG. 4$a$ (the duty cycle loss appears between time points t5 and t6), the duty cycle loss shown in the FIG. 4$b$ is reduced (the period between time points t6' and t6 shown in the FIG. 4$b$ indicates the duty cycle loss which is eliminated from FIG. 4$a$).

Figure 5B:
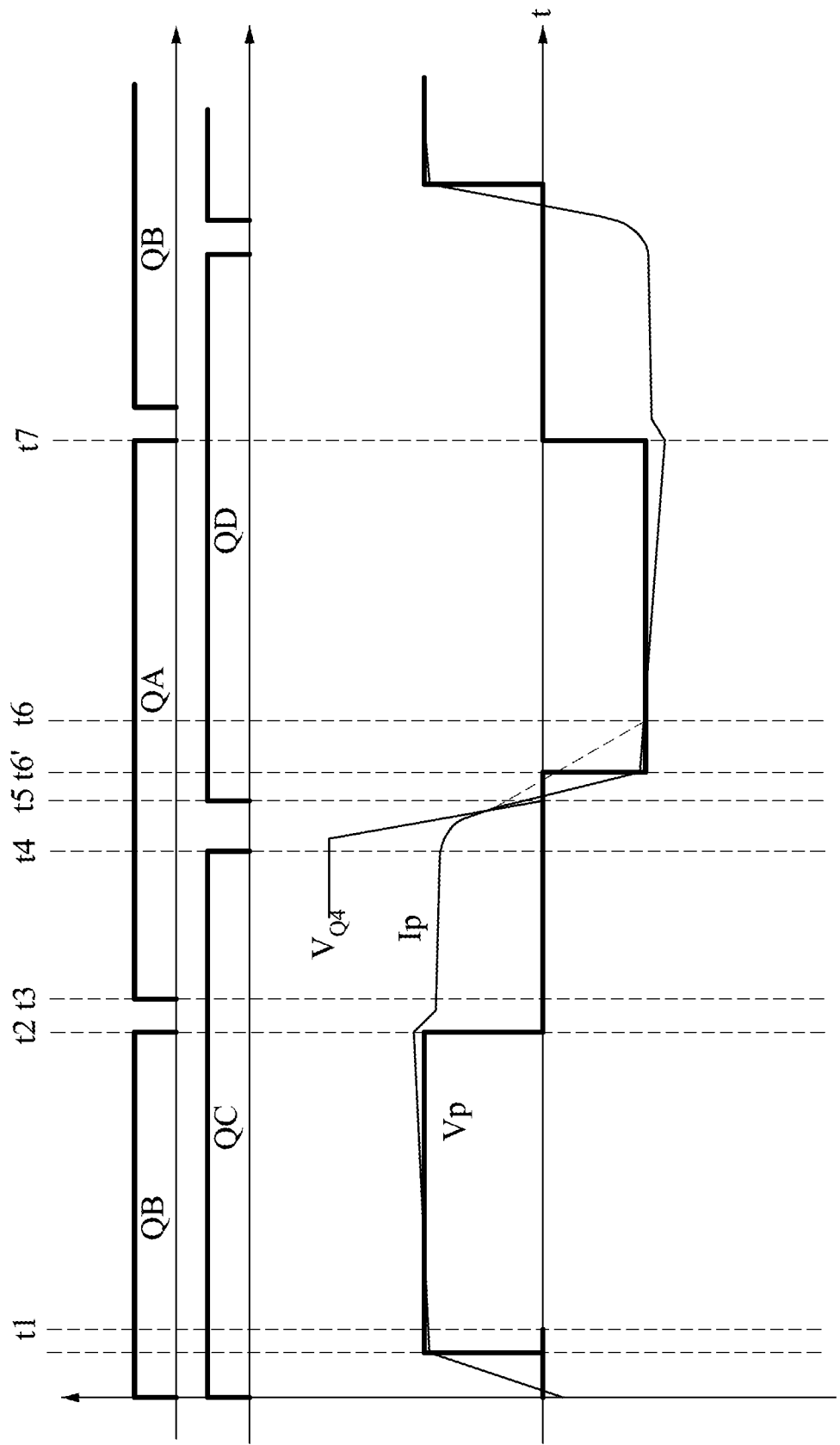
Figure 6B:
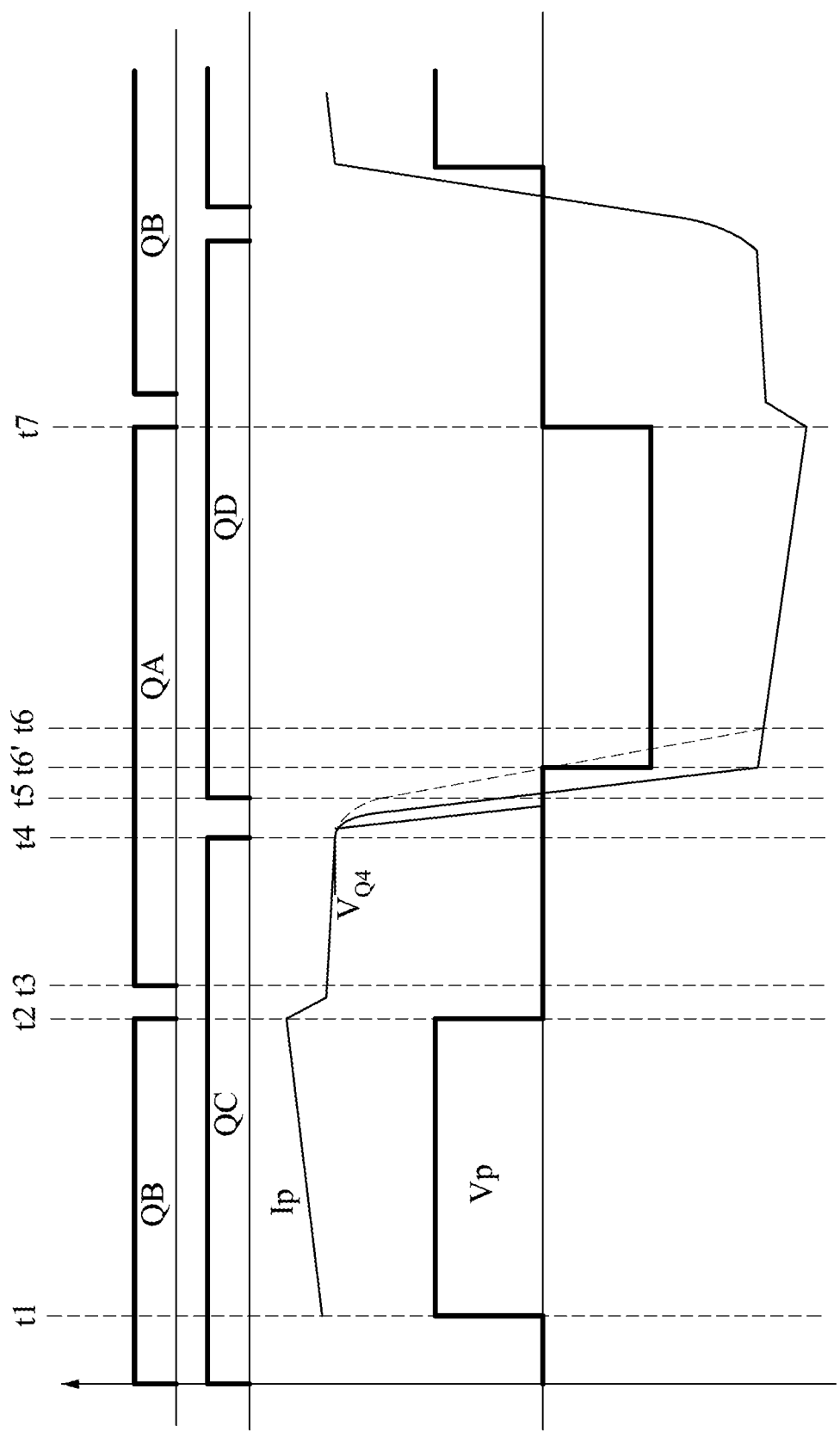

FIG. 5$b$ is another timing chart indicating operations of the power conversion system during normal load condition. FIG. 6$b$ is another timing chart indicating operations of the power conversion system during heavy load condition. In FIGS. 5$b$ and 6$b$, the period between time points t5 and t6 indicates duty time loss of the power conversion system which the amount of the synchronous rectifying units performing synchronous rectifying procedure and the coupling distance between the secondary winding 320 $a$~320 $d$ and the primary windings 310 are not controlled (for example, the first to fourth synchronous rectifying units 410 $a$~410 $d$ perform synchronous rectifying procedure as the same time). On the contrary, the period between time points t5 and t6' indicates duty time loss of the power conversion system which the amount of the synchronous rectifying units performing synchronous rectifying procedure and the coupling distance between the secondary winding 320 $a$~320 $d$ and the primary windings 310 are well controlled (wherein the period between time points t6' and t6 shown in the FIG. 5$b$ and FIG. 6$b$ indicates the duty cycle loss which is eliminated from FIGS. 5$a$ and 6$a$).

In order to prevent generated heat that arises at the time of driving from being stored, the first to fourth synchronous rectifying units 410 $a$~410 $d$ may perform synchronous rectifying procedure in sequence. For example, the controller 420 may progressively increase the amount of the synchronous rectifying units (410 $a$~410 $d$) performing synchronous rectifying procedure when the power required for the electronic device is gradually increased. In addition, the controller 420 may drives the synchronous rectifying units (410 $a$~410 $d$) in a convergence manner when only one of the synchronous rectifying units (410 $a$~410 $d$) performs synchronous rectifying procedure. More particularly, the convergence manner may first make the synchronous rectifying unit (410 $a$~410 $d$) far from a central axis of the isolating transformer 30 shown in the FIG. 7 perform synchronous rectifying procedure, and next makes the synchronous rectifying units close to the central axis of the transformer shown in the FIG. 7 to prevent generated heat that arises at the time of driving from being stored, i.e., the controller 420 may makes the first synchronous rectifying units 410 $a$, the fourth synchronous rectifying units 410 $d$, the second synchronous rectifying units 410 $b$, and the third synchronous rectifying units 410 $c$ shown in the FIG. 7 perform synchronous rectifying procedure in sequence. It should be noted that if the distances between two synchronous rectifying units and the central axis are the same, the two synchronous rectifying units interleaved perform synchronous rectifying procedure.

Reference is made back to Table 1, in 1st and 2nd states, they are only one of the synchronous rectifying units is placed in the conducting state and performs synchronous rectifying procedure. As can be shown in FIG. 7, the distance between the synchronous rectifying unit performing synchronous rectifying procedure in 1st state and the central axis of the isolating transformer 30 is equal to that of in 2nd state, and the leakage inductance in 1st state is close to that of in 2nd state. Therefore, the controller 420 may interleaved drive the first synchronous rectifying unit 410 $a$ and the fourth synchronous rectifying unit 410 *d* to conduct the power coupled to the secondary winding 320 *a* and 320 *d* to the electronic device while the electronic device is operated under the same condition (such as light load condition) to prevent generated heat that arises at the time of driving from being stored in particular synchronous rectifying unit (410 *a*~410 *d*), which is placed in the conducting state and performs synchronous rectifying procedure all the time.

It should be noted that the synchronous rectifying units (410 *a*~410 *d*) may be interleaved placed in the conducting state (i.e. the first to fourth synchronous rectifying units 410 *a*~410 *d* may be driven to interleaved perform synchronous rectifying procedure) according to the distance between the central axis and the synchronous rectifying units (410 *a*~410 *d*), for example, the synchronous rectifying units (410 *a*~410 *d*) with same distance from the central axis may be interleaved driven to perform synchronous rectifying procedure. However, that the synchronous rectifying units (410 *a*~410 *d*) may be driven to interleaved perform synchronous rectifying procedure according to inductance in different operation states of the synchronous rectifying units (410 *a*~410 *d*). For example, the operation states with similar leakage inductance (such as the difference in leakage inductance between the operation states is less than 5 µH) may be interleaved driven to perform synchronous rectifying procedure.

In sum, the power conversion system of the present disclosure performs a power conversion procedure for powering the electronic device includes step as following first, the power conversion system including a primary winding 310, a plurality of secondary windings 320 *a*~320 *d*, and a plurality of synchronous rectifying units 410 *a*~410 *d* is provided. There are a plurality of coupling distances between the primary winding 310 and the secondary windings 320 *a*~320 *d*.

Next, the operation condition (such as light load condition, normal load condition, or heavy load condition) of the electronic device is measured by measuring a current required by the electronic device. Specifically, the current required for the electronic device during light load condition may be smaller than that of during normal load condition, and the current required for the electronic device during heavy load condition may be larger than that of during normal load condition. Thereafter, the synchronous rectifying units (410 *a*~410 *d*) are selectively placed in a conducting state for varying a leakage inductance of the power conversion system, thus a output current of the power conversion system is modulated to meet the current requirement of the electronic device. The output current is only provided by the synchronous rectifying units 410 *a*~410 *d* which is placed in the conducting state, and the power conversion system has a lowest leakage inductance when all of the output-controlling modules 400 *a*~400 *d* are placed in the conducting state, therefore a largest output current is provided.

The power conversion system may vary the leakage inductance by selectively place one of the synchronous rectifying units 410 *a*~410 *d* in the conducting state at a time; however, the power conversion system may further selectively place two or more synchronous rectifying units 410 *a*~410 *d* at a time. Besides, the leakage inductance of the power conversion system is varied when an amount of the synchronous rectifying units 410 *a*~410 *d* placed in the conducting state changes.

Figure 11:
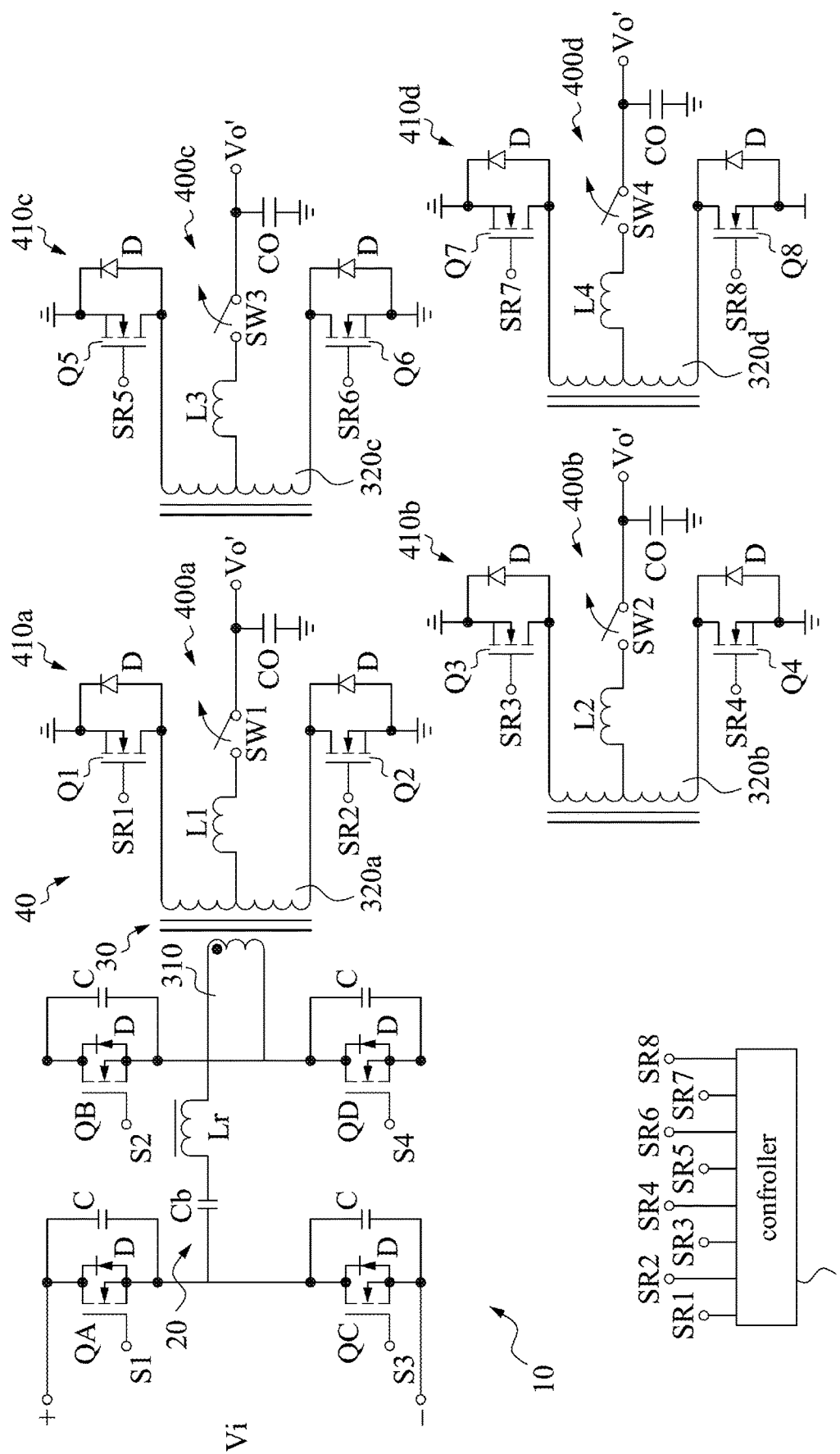
FIG. 11 is a circuit diagram of a power conversion system according to a second embodiment of the present disclosure.

Reference is made to FIG. 11, which is a circuit diagram of a power conversion system according to a second embodiment of the present disclosure. In FIG. 11, the power conversion system includes a switching module 10, a resonant module 20, a transformer 30, and an output-controlling device 40. The transformer 30 includes a primary winding 310 and a plurality of secondary windings 320 *a*~320 *d* coupled with the primary winding 310.

The function and relative description of switching module 10 and the resonant module 20 of the power conversion system shown in the FIG. 11 are the same as that of first embodiment (shown in the FIG. 2) mentioned above and are not repeated here for brevity, and the switching module 10 and the resonant module 20 of the power conversion system shown in the FIG. 11 can achieve the functions as power conversion system of the first embodiment does. It should be noted that the transformer 30 and the output-controlling device 40 shown in the FIG. 11 is different from that of the first embodiment.

In FIG. 11, the transformer 30 is a center-tapped transformer, which has an advantage of compact. However, the isolating transformer shown in FIG. 2 has an advantage of double-current. The output-controlling device 40 is electrically connected to the secondary winding 320 *a*~320 *d* of the transformer and includes first to fourth synchronous rectifying units 410 *a*~410 *d*, controller 420, and first to fourth output switch SW1~SW4. The first synchronous rectifying unit 410 *a* is connected to the secondary winding 320 *a*, the second synchronous rectifying unit 410 *b* is connected to the secondary winding 320 *b*, the third synchronous rectifying unit 410 *c* is connected to the secondary winding 320 *c*, and the fourth synchronous rectifying unit 410 *d* is connected to the secondary winding 320 *d*.

The first synchronous rectifying unit 410 *a* includes rectifying switches Q1 and Q2, the second synchronous rectifying unit 410 *b* includes rectifying switches Q3 and Q4, the third synchronous rectifying unit 410 *c* includes rectifying switches Q5 and Q6, and the second synchronous rectifying unit 410 *d* includes rectifying switches Q7 and Q8. Specifically, the sources of the rectifying switch Q1 and Q2 are connected to ground, the drains thereof is connected to two taps of the second winding 320 *a*, and the filter L1 is connected to the center-tap of the second winding 320 *a*; the sources of the rectifying switch Q3 and Q4 are connected to ground, the drains thereof is connected to two taps of the second winding 320 *b*, and the filter L2 is connected to the center-tap of the second winding 320 *b*; the sources of the rectifying switch Q5 and Q6 are connected to ground, the drains thereof is connected to two taps of the second winding 320 *c*, and the filter L3 is connected to the center-tap of the second winding 320 *c*; the sources of the rectifying switch Q7 and Q8 are connected to ground, the drains thereof is connected to two taps of the second winding 320 *d*, and the filter L4 is connected to the center-tap of the second winding 320 *d*. The gates SR1~SR8 of the rectifying switch Q1~Q8 and the first to fourth output switch SW1~SW4 are connected to the controller 420. The controller 420 sends signals the rectifying switch Q1~Q8 to drive one of the first the fourth synchronous rectifying units 410 *a*~410 *d* to perform synchronous rectifying procedure. The controller 420 further sent signals to the first to fourth output switch SW1~SW4 to makes one of the first to fourth output switch SW1~SW4 to turn off or on, wherein when the first to fourth output switch SW1~SW4 is turned on, the rectified power con be conducted to the electronic device. The center tap of the transformer 30 is further electrically connected to an output capacitor Co.

The function and relative description of other components of power conversion system of this embodiment are the same as that of first embodiment mentioned above and are not repeated here for brevity, and the power conversion of this embodiment can achieve the functions as the power conversion system of the first embodiment does.

Figure 12:
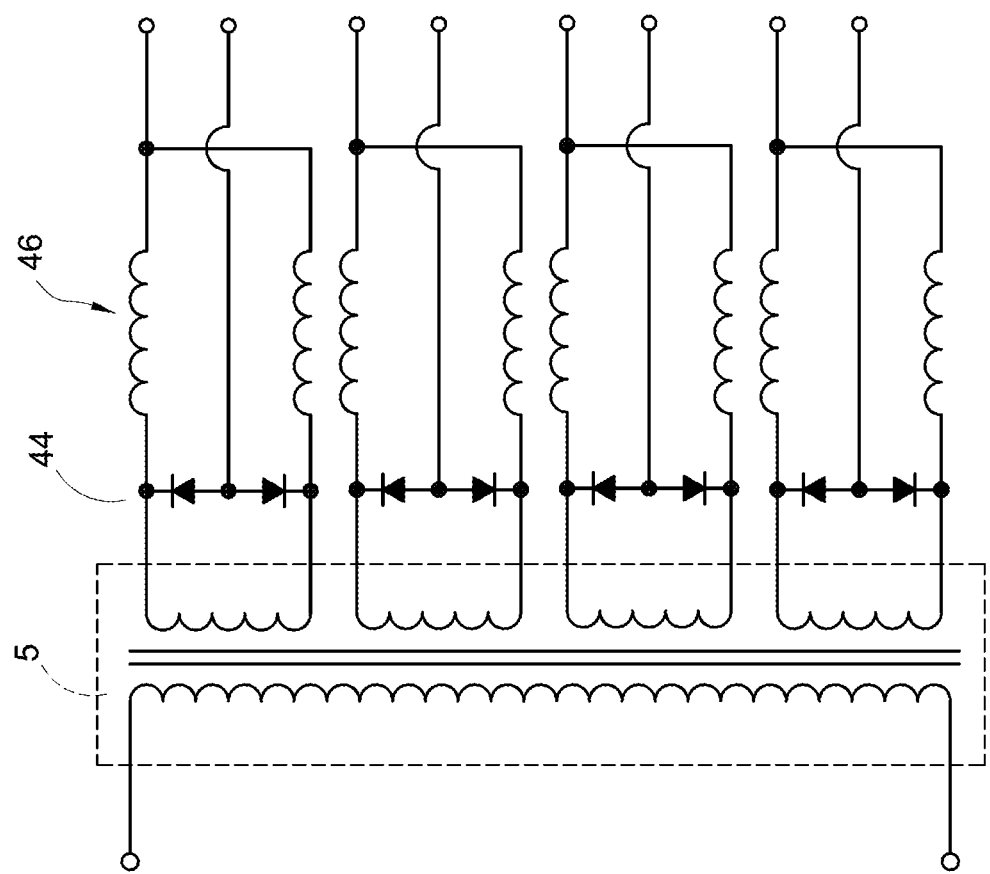
FIG. 12 is a circuit diagram of an integrated power-converting module according to the present invention.

Reference is made to FIG. 12, which is a circuit diagram of an integrated power-converting module according to the present invention. The integrated power-converting module having functions of changing voltage, rectification, and filtration, and includes a transformer 5, a plurality of rectifiers 44, and a plurality of filter 46. The rectifier 44 and the filters 46 are electrically connected to a secondary side of the transformer 5. The rectifier 44 receives the converted electric power outputted from the secondary side of the transformer 5 and converts the converted electric power from alternative current (AC), which periodically reverse direction, to direct current (DC), which flow in only one direction. The filter 46 is configured to remove the unwanted AC components (or called ripple) of the rectifier 44 output, thus the integrated power-converting module can output a smooth and steady DC.

Figure 13:
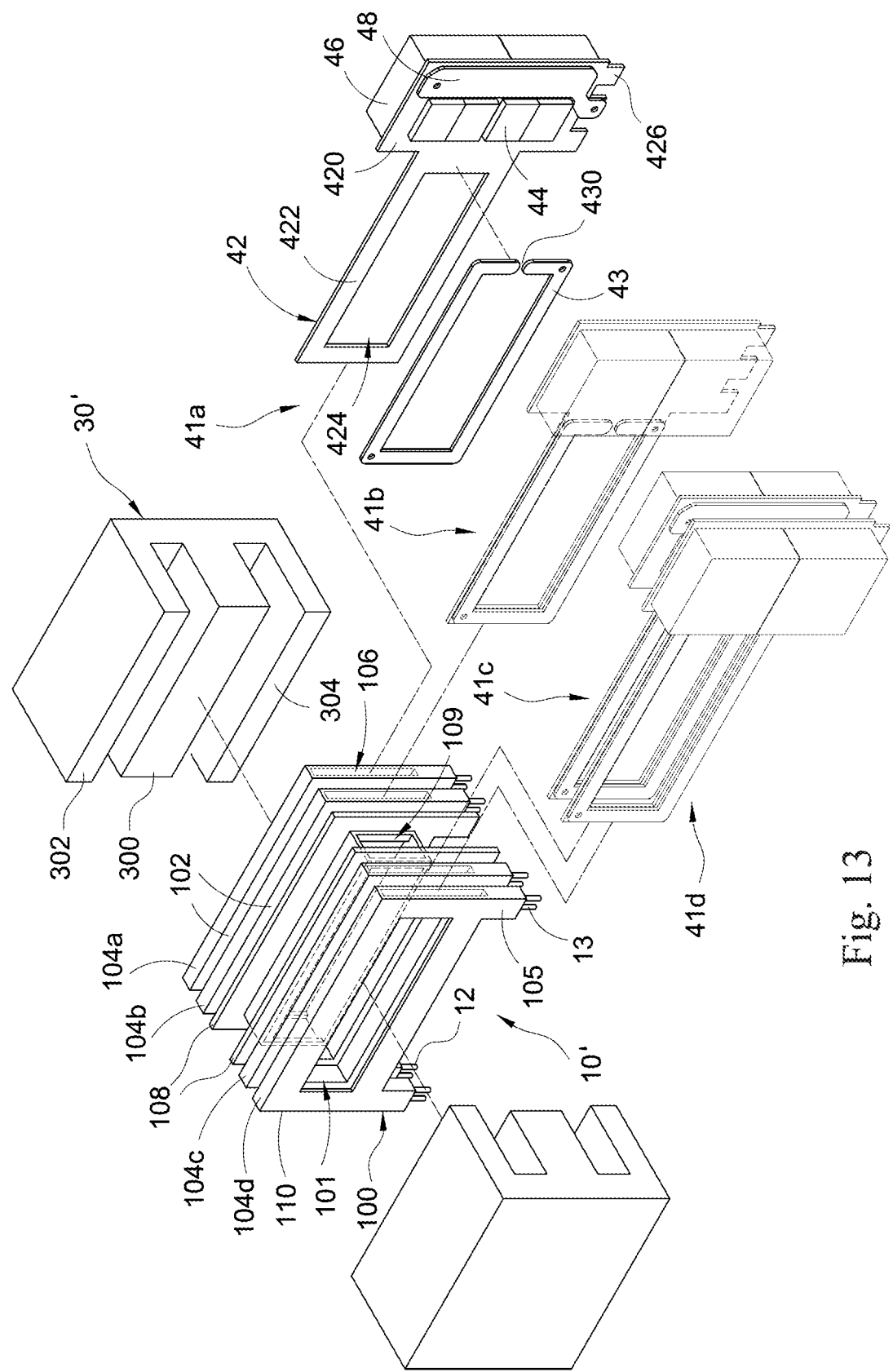
FIG. 13 is an exploded view of the integrated power-converting module according to the present invention.
Figure 14:
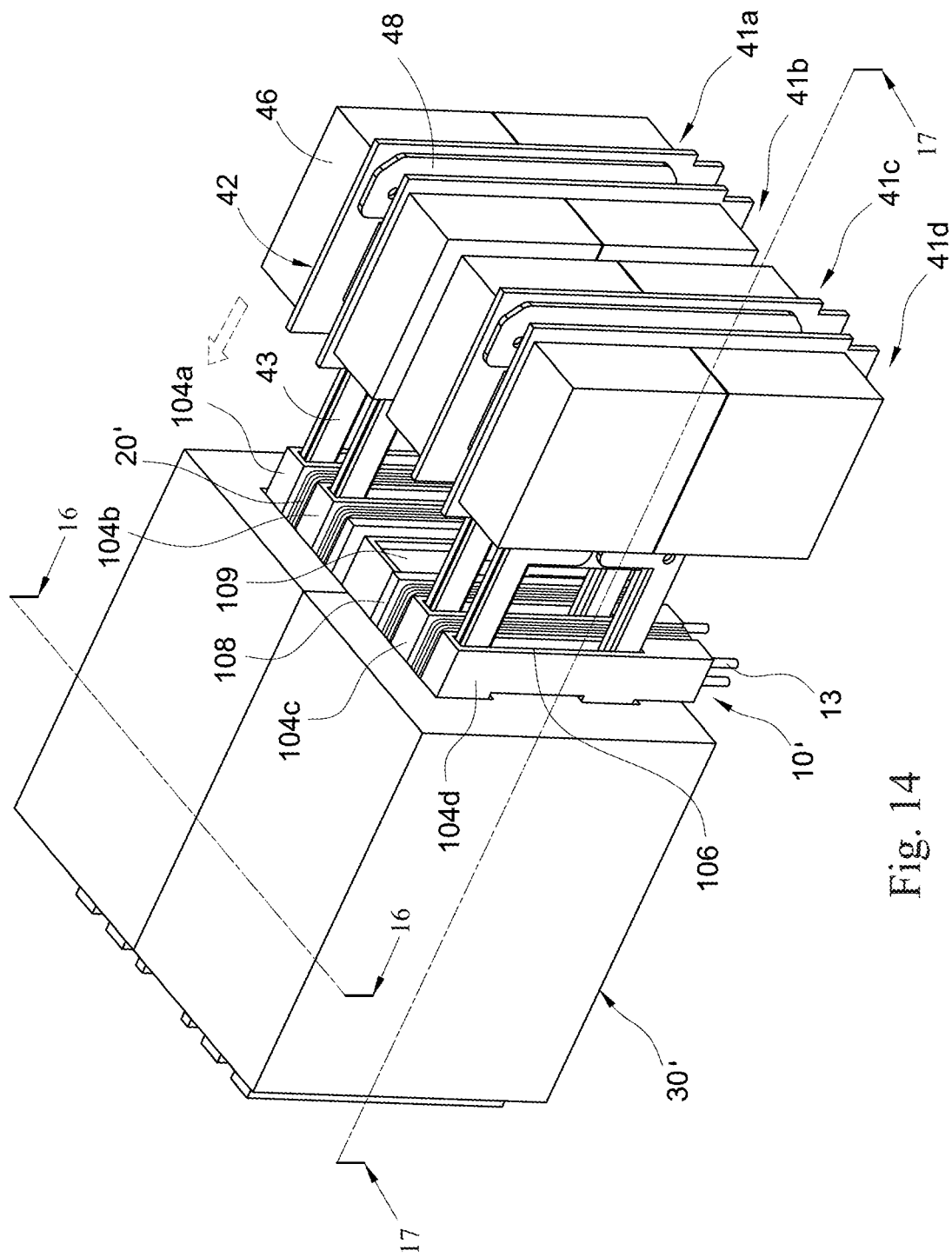
FIG. 14 is a partially assembled view of the integrated power-converting module according to the present invention.
Figure 15:
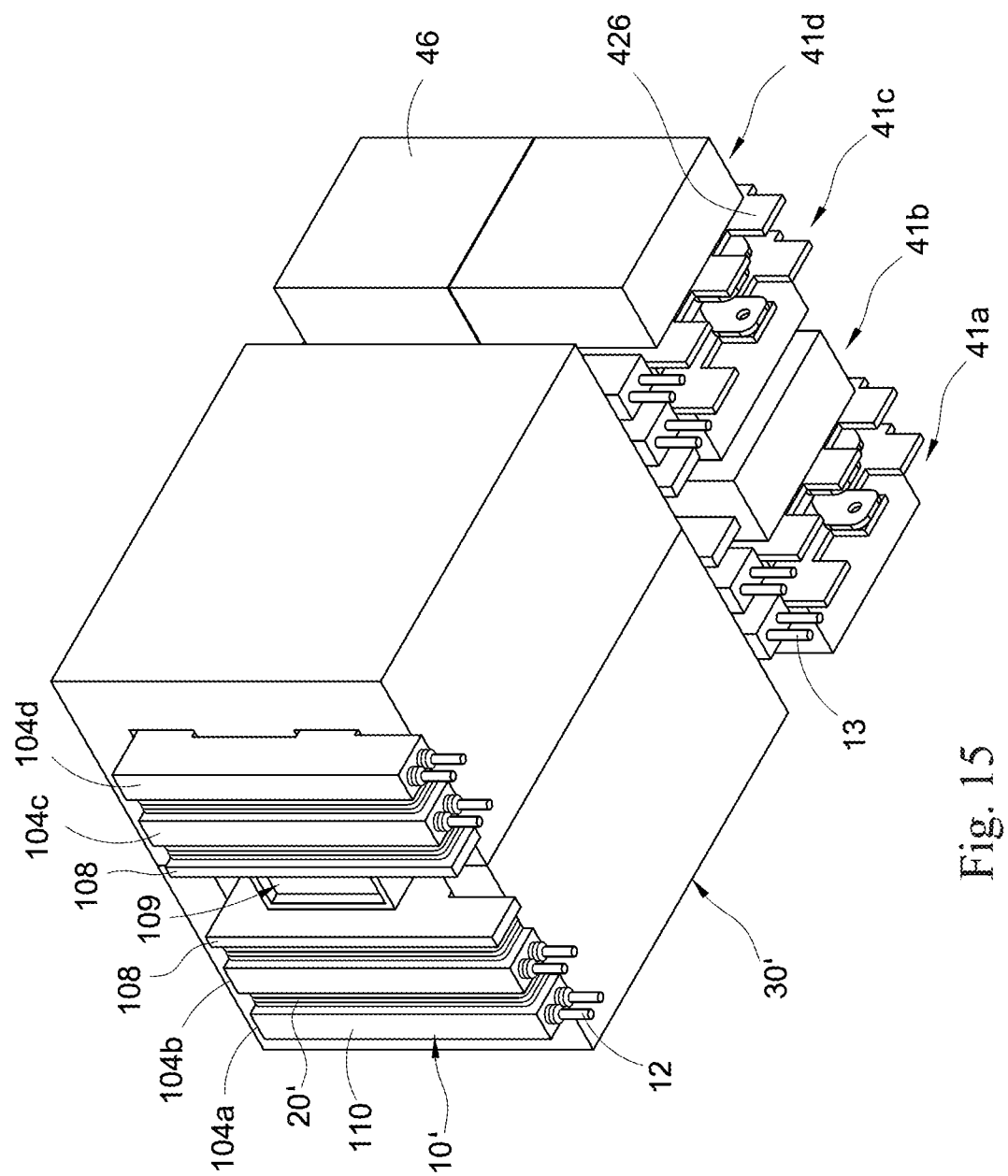
FIG. 15 is an assembled view of the integrated power-converting module according to the present invention.

Reference is made to FIG. 13 and FIG. 14, which are respectively an exploded view and an assembled view of the integrated power-converting module according to the present invention. The integrated power-converting module includes a bobbin 10', at least one primary coil 20, a magnetic core assembly 30', and a plurality of power-converting units 41 $a$~41 $d$.

The bobbin 10' includes a main body 100, a plurality of winding portions 102, and a plurality of receiving portions 104 $a$~104 $d$. The main body 100 includes a first channel 101. The amount of the receiving portions 104 $a$~104 $b$ is the same as that of the winding portions 102. The receiving portions 104 $a$~104 $d$ are arranged in a parallel manner, and the winding portions 102 and the receiving portions 104 $a$~104 $d$ are arranged in a stagger manner.

The main body 100 further includes a second channel 109 communicating with the first channel 101 and substantially perpendicular thereto.

The bobbin 10' of the present invention includes four receiving portions 104 $a$~104 $d$ arranged at two opposite sides of the second channel 109. In particular, the receiving portions 104 $a$ and 104 $b$ are arranged at one side of the second channel 109, and the receiving portions 104 $c$ and 104 $d$ are arranged at the other side thereof. The winding portions 102 also arranged at the opposite sides of the second channel 109, and the winding portions 102 and the receiving portions 104 $a$~104 $d$ are arranged in staggered manner.

Each of the receiving portions 104 $a$~104 $d$ including a slot 106 communicating with the first channel 101 and a side-wall 110 disposed opposite to the power-converting units 41 $a$~41 $d$ and enclose the slot 106.

Each of the receiving portions 104 $a$~104 $d$ further includes two protrusions 105 arranged on the bottom and far away from each other. An extending direction of the protrusions 105 is substantially perpendicular to the opening direction of the slots 106. The power-converting module further includes a plurality of electrically conductive terminals 12 and a plurality of fixing members 13, the electrically conductive terminals 12 are connected to the protrusions 105 far away from the power-converting units 41 $a$~41 $b$, and the fixing members 13 are connected to the protrusions 105 close to the power-converting units 41 $a$~41 $d$.

The primary coil 20 is electrically connected to the electrically conductive terminals 12 and is wound on the winding portions 102 in S-shaped, and initial end of the primary coil 20 is connected to one of the electrically connective terminal 12, and a terminal end of the primary coil 20 is connected to the other electrically connected terminal 12, as shown in FIG. 14. The primary coil 20 is a primary winding of the integrated power-converting module.

The main body 100 further includes a plurality of spacers 108 arranged between the second channel 109 and the receiving portions 104 $b$ and 104 $c$ close to the second channel 109 for spacing the second channel 109 and the receiving portions 104 $b$ and 104 $c$.

Figure 16:
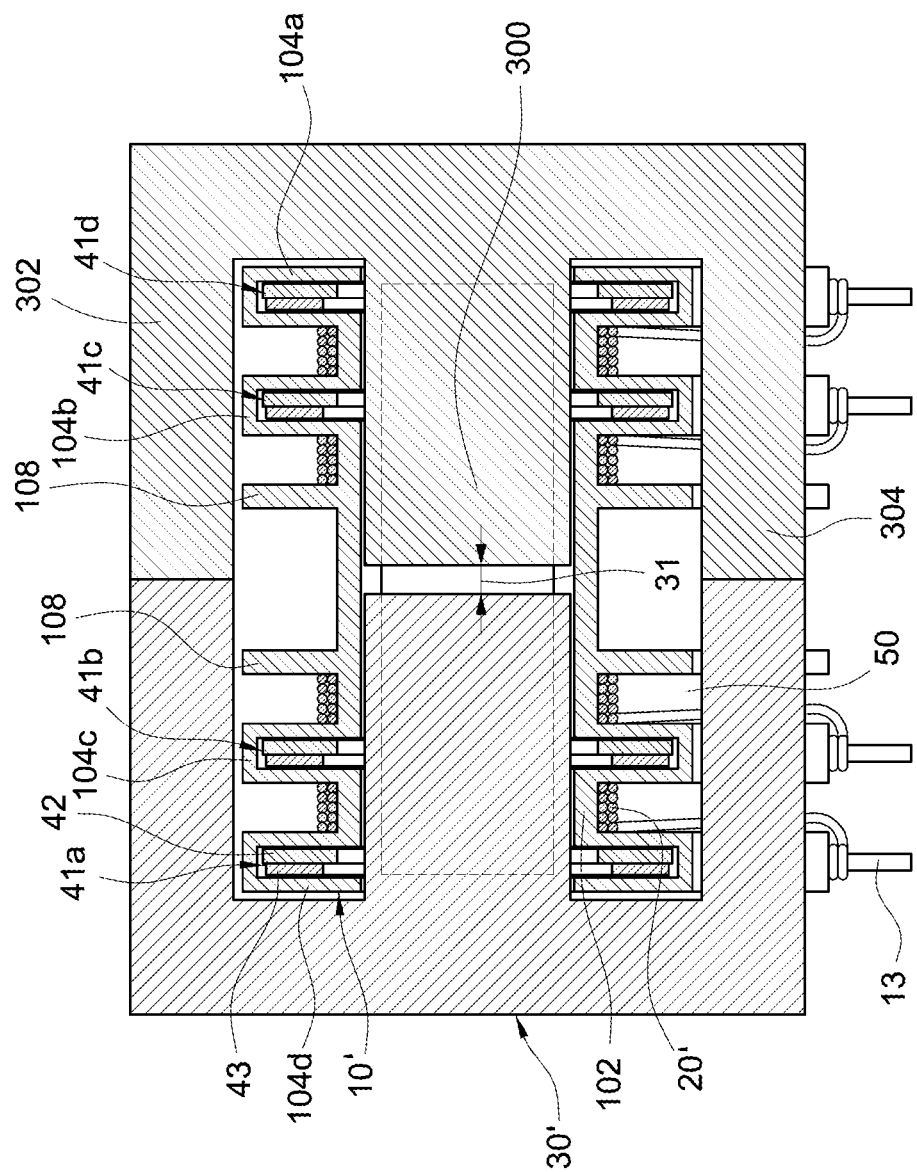
FIG. 16 is a sectional view of the integrated power-converting module along line 16-16 shown in FIG. 14.

The magnetic core assembly 30' is assembled with the bobbin 102 and partially inserted into the first channel 101. The magnetic core 30' can be assembled by two E-shaped magnetic cores, and each magnetic core includes a central led 300 and two lateral legs 302 and 304 arranged at two opposite sides of the central lag 300 and connected thereto. When the magnetic core assembly 30' is assembled with the bobbin 102, the top surfaces of the lateral leg 302 and 304 are contacted with each other, the central leg 300 is received within the first channel 101, and an air gap 31 is formed between the top surface of the central legs 300 and within the second channel 109, as shown in FIG. 16, and then an effect of energy storage is achieved. It should be noted that if the primary coil 20 does not wind on above the air gap 31, an eddy current loss can then be effectively reduce.

Besides, when the magnetic core assembly 30' is assembled with the bobbin 102, there are air passages 50 allowing vapor flowing therethrough exist, and the air passages 50 are formed between the lateral lags 302 and 304 of each of the magnetic core and the main body 100. Thus the integrated power-converting module has a good thermal dissipating effect.

The power-converting units 41 $a$~41 $d$ are arranged in a parallel manner and each of the power-converting units 41 $a$~41 $d$ includes a circuit board 42, a rectifier 44, and a filter 46.

The circuit board 42 includes a base portion 420 and an extending portion 422 connected to the base portion 420. The base portion 420 and the extending portion 422 are both placed with copper foil, and an electrically connected sheet 43 is placed on the extending portion 422 and attached to the copper foil formed thereon, thus the electrically conductive sheet 43, the rectifier 44, and the filter 46 can be electrically connected to each other. As shown in the FIG. 13, a profile of the base portion 420 is substantially of rectangular, and a plurality of connecting terminals 426 are connected to the bottom of each of the base portions 420.

A penetrating hole 424 is formed on the extending portion 422 so that a profile of the extending portion 422 is ring shape and corresponding to that of the receiving portions 104 $a$~104 $d$, and when the extending portions 422 are inserted into the receiving portions 104 $a$~104 $d$, the penetrating hole 424 of each extending portion 422 is aligned with and communicating with the first channel 101. The extending portions 422 are configured to transit alternative current to the rectifiers 44.

The power-converting unit 41 $a$~41 $d$ can further includes the electrically conductive sheets 43 placed on each of the extending portions 423 and attached on the copper foil. A profile of the electrically conductive sheet 43 is corresponding to that of the extending portion 423 and has an opening 430, thus the electrically conductive sheets 43 is of C-shaped. The electrically conductive sheets 43 configured to conduct current can be made of tinned copper for providing a good electrical conduction and thermal dissipation.

In the present invention, the primary coil 20 wound on the winding portion 102, the magnetic core assembly 30' assembled with the bobbin 10', the extending portions 422 where placed with copper foil (and the electrically conductive sheet 43) and inserted into the slots 106 of the bobbin 10', collectively construct the transformer 5 shown in FIG. 12.

The rectifier 44 is placed on one surface of the base portion 420 of the circuit boards 42, and the filter 46 is placed on the other surface of the base portion 420 thereof. The rectifier 44 can be synchronous rectifier composed of four metal-oxide-semiconductor field-effect transistors (MOSFETs). Each of the power-converting units 41 $a$~41 $d$ further includes a electrically conductive plate 48 placed on the base portion 420, and the electrically conductive plate 48 and the rectifier 44 are placed on the same surface. The filter 46 is, for example, choke.

The surface of the power-converting unit 41 $b$ placed with the filter 46 faces the surface of the power-converting unit 41 $c$ placed with the filter 46, which means that the filters 46 of the two power-converting units 41 $b$ and 41 $c$ close to the second channel 109 face each other, and the length of two filters 46 aforementioned is substantially equal to the width of the second channel 109.

Moreover, the surface of the circuit board 42 of the power-converting unit 41 $a$ placed with the rectifier 44 faces the surface of the circuit board 42 of the power-converting unit 41 $b$ placed with the rectifier 44. In the other words, two power-converting units 41 $a$ and 41 $b$ (or 41 $c$ and 41 $d$) arranged at the same side of the second channel 109 face each other. In such manner, the integrated power-converting module is compact since the power-converting units 41 $a$~41 $d$ are tightly arranged.

Figure 17:
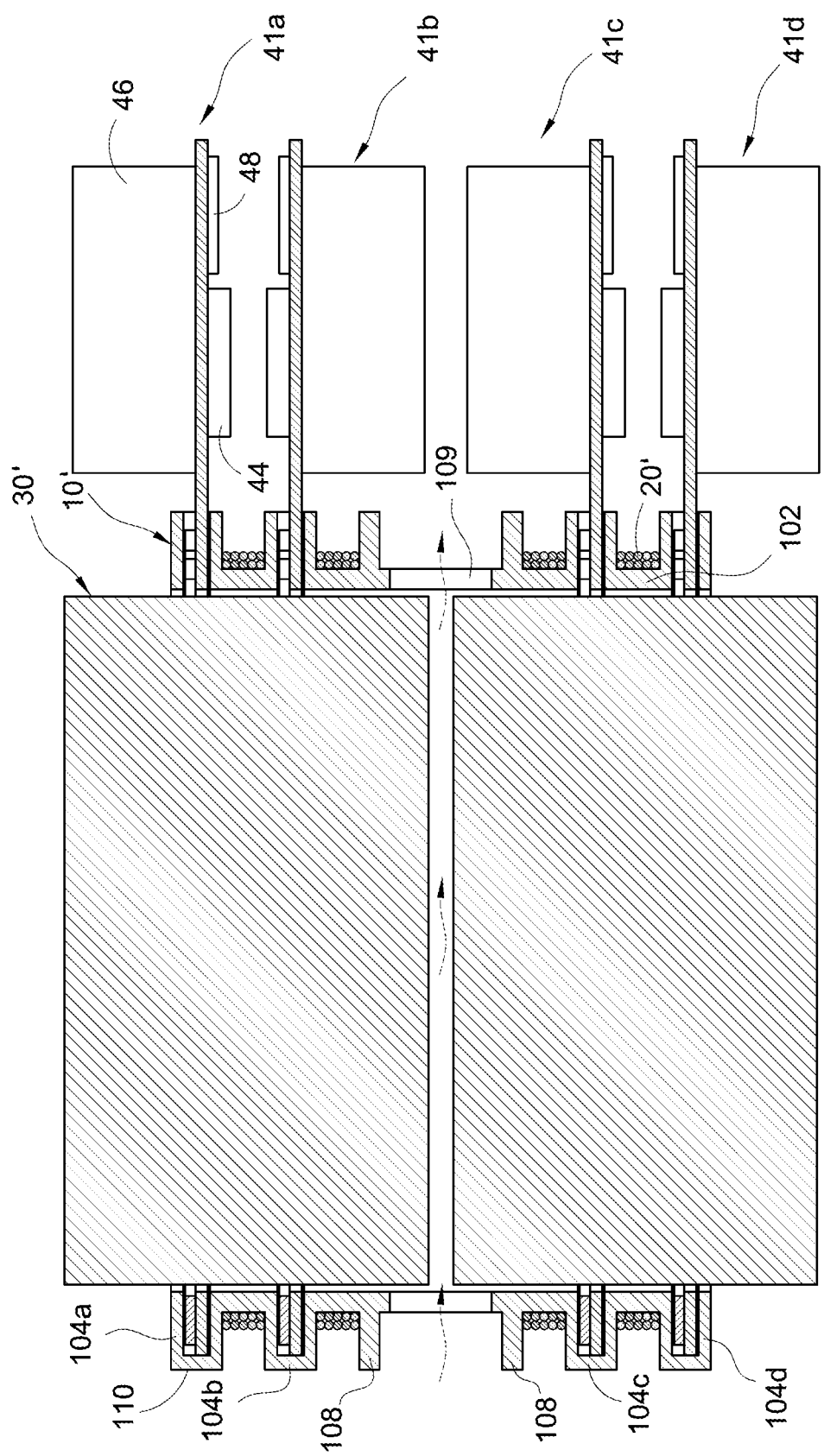
FIG. 17 is a sectional view of the integrated power-converting module along line 17-17 shown in FIG. 14.

The integrated power-converting module of the present invention having circuit diagram shown in FIG. 12 and arrangement shown in FIG. 13 and FIG. 17, which has advantage of compact and eddy current loss and switching loss can be effectively reduced.

The integrated power-converting module can be mounted on a circuit main board, in the other words, the circuit main board is disposed below the integrated power-converting module. The fixing members 13 is inserted into the circuit main board, so that the integrated power-converting module can stand on the circuit main board to prevent the integrated power-converting module from tilt caused by heavy weight. It should be noted that if the integrated power-converting module includes both the fixing members 13 and the electrically conductive terminals 12, the electrically conductive terminals 12 can be disposed at the bottom of the receiving portions 104 $a$~104 $d$, and the primary coil 30' can be connected to the electrically connected terminals 12 and electrically connected to the circuit main board via the electrically connected terminals 12. The fixing members 13 are disposed at the bottom of the receiving portions 104 $a$~104 $d$ where the electrically conductive terminal is not disposed, such that the integrated power-converting module can stand firmly on the circuit main board. If the integrated power-converting module only includes the fixing members 13, the fixing members 13 are disposed at the bottom of the receiving portions 104 $a$~104 $d$, and the primary coil 20 wound on the bobbin 10' is directly connected to the circuit main board (by fly line connection). In the practical application, the arrangement of the electrically connective terminals 12 and the mixing member 13 can be adjusted based on the different situations.

The integrated power-converting module of the present invention for outputting multiple direct current electric powers integrates secondary windings (the copper foil or electrically conductive sheet 43 formed on the extending portions 422), the rectifier 44, and the filter 46 into one circuit board 42, which is assembled with the bobbin 10' by inserting the extending portions 422 into the receiving portions 104 $a$~104 $d$ respectively. Thus it is compact and easily to manufacture and assemble.

Figure 18:
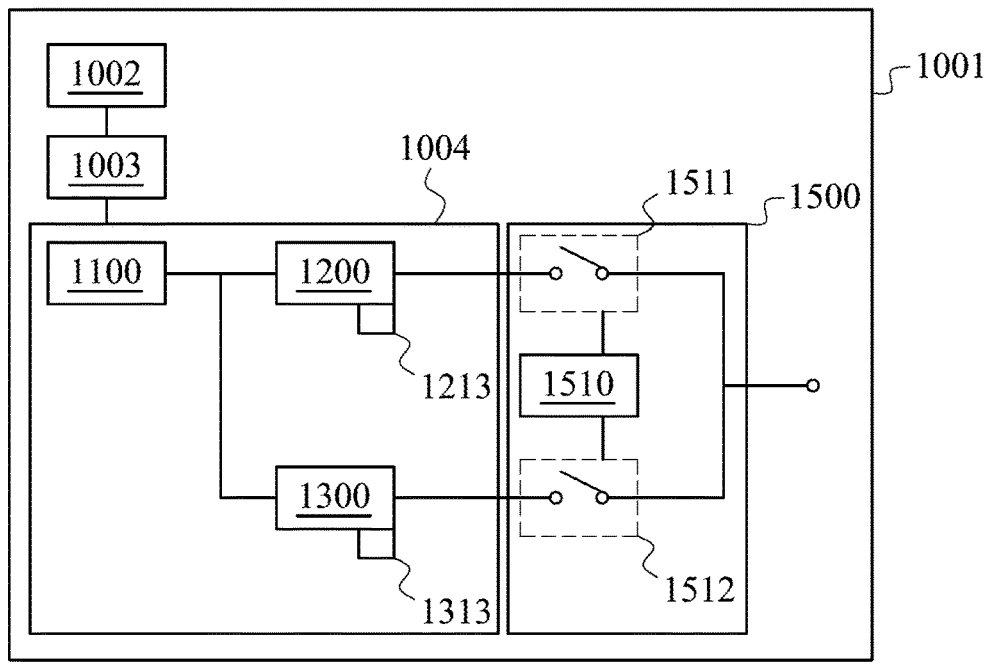
FIG. 18 to FIG. 29 illustrate a power conversion system according to one embodiment of the present invention.

As shown in FIG. 18, the power conversion system 1000 includes a printed circuit board 1001, a switching module 1002, a resonance module 1003, a voltage conversion module 1004, and an output control device 1500. As shown in FIG. 18, in structure, the resonant module 1003 is electrically connected between the switching module 1002 and the voltage conversion module 1004, and the voltage conversion module 1004 is electrically connected to the output control device 1500. For example, the switching module 1002 may be the full bridge switching module 10 described above, the resonant module 1003 may be the resonant module 20 described above, and the voltage conversion module 1004 may be the isolation transformer 30 described above, and the output control device 1500 may be the output-controlling device 40 as described above. The switching module 1002, the resonant module 1003, the voltage conversion module 1004, and the output control device 1500 may be disposed on the printed circuit board 1001 or may be disposed on different printed circuit boards electrically connected to each other. Those with ordinary skill in the art may flexibly design depending on the desired application.

Figure 19:
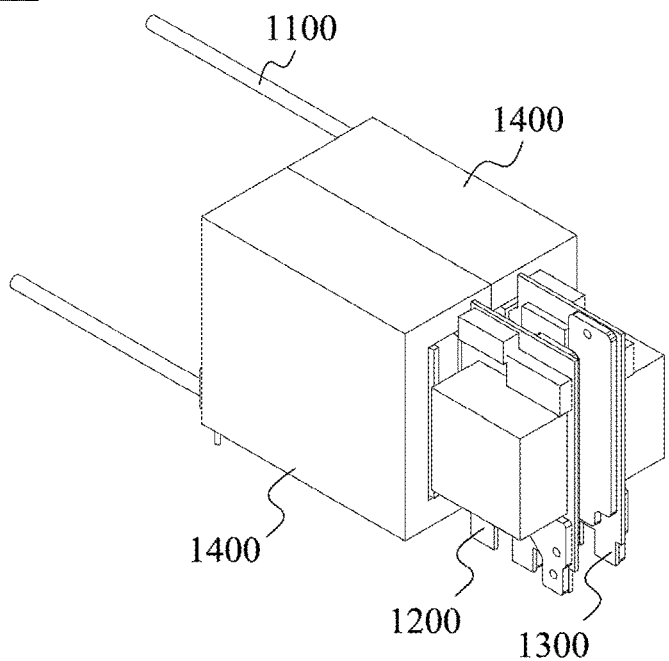

Refer to FIG. 18 and FIG. 19, the voltage conversion module 1004 includes a front side magneto-sensitive unit 1100, a first voltage conversion unit 1200, and a second voltage conversion unit 1300. The front-side magneto-sensitive unit 1100 is electrically connected the resonant module 1003, and the front-side magneto-sensitive unit 1100 receives the electric energy transmitted from the resonant module 1003 to generate a magnetic energy signal and isolatedly transmits the magnetic energy signal. The first voltage conversion unit 1200 and the front side magneto-sensitive unit 1100 form a magnetic loop, and the first voltage conversion unit 1200 includes a first output portion 1213. The first output portion 1213 is inserted into the printed circuit board 1001. The second voltage conversion unit 1300 and the front side magneto-sensitive unit 1100 form a magnetic loop, and the second voltage conversion unit 1300 includes a second output portion 1313. The second output portion 1313 is inserted into the printed circuit board 1001. The first voltage conversion unit 1200 and/or the second voltage conversion unit 1300 receive the magnetic energy signal transmitted from the front side magneto-sensitive unit 1100 and process the magnetic energy signal into an energy signal. The first output portion 1213 and the second output portion 1313 conduct the processed energy signal to the printed circuit board 1001.

The output control device 1500 includes a controller 1510, a first output control switch 1511 and a second output control switch 1512. The first output control switch 1511 is electrically connected to the first output portion 1213, and the second output control switch 1512 is electrically connected to the second output portion 1313. The output control device 1500 is mainly based on the energy demand of the load side to control the first output control switch 1511 and the second output control switch 1512, so as to supply the processed energy signal from the first voltage conversion unit 1200 and/or the second voltage conversion unit 1300 to the load side.

In use, the switching module 1002 is used to pass the positive half-cycle or negative half-cycle of the input AC, or to convert the positive half-cycle or the negative half-cycle to another half-cycle, so that all half cycles are positive half cycle or negative half-cycle, and then output one-direction signal of all positive half-cycle or negative half-cycle. The resonant module 1003 is used to receive and process a one-direction signal, and output a first voltage.

The front side magneto-sensitive unit 1100 is used to receive the first voltage and generate magnetic energy. The first voltage conversion unit 1200 and the front side magneto-sensitive unit 1100 form a magnetic loop to magnetize each other to produce a first induced current and rectify the first induced current as a first current. The first output portion 1213 is used to conduct the first current to the printed circuit board 1001. The second voltage conversion unit 1300 and the front side magneto-sensitive unit 1100 form a magnetic loop to magnetize each other to produce a second induced current and rectify the second induced current as a second current. The second output portion 1313 is used to conduct the second current to the printed circuit board 1001.

The controller 1510 controls the first output control switch 1511 to be turned on or off or the second output control switch 1512 to be turned on or off. When the first output control switch 1511 is turned on and the second output control switch 1512 is turned off, the first current is outputted; when the first output control switch 1511 is turned off and the second output control switch 1512 is turned on, the second current is outputted; when the first output control switch 1511 and the second output control switch 1512 are all turned on, a third current is outputted, where the third current is the sum of the first current and the second current.

Figure 20:
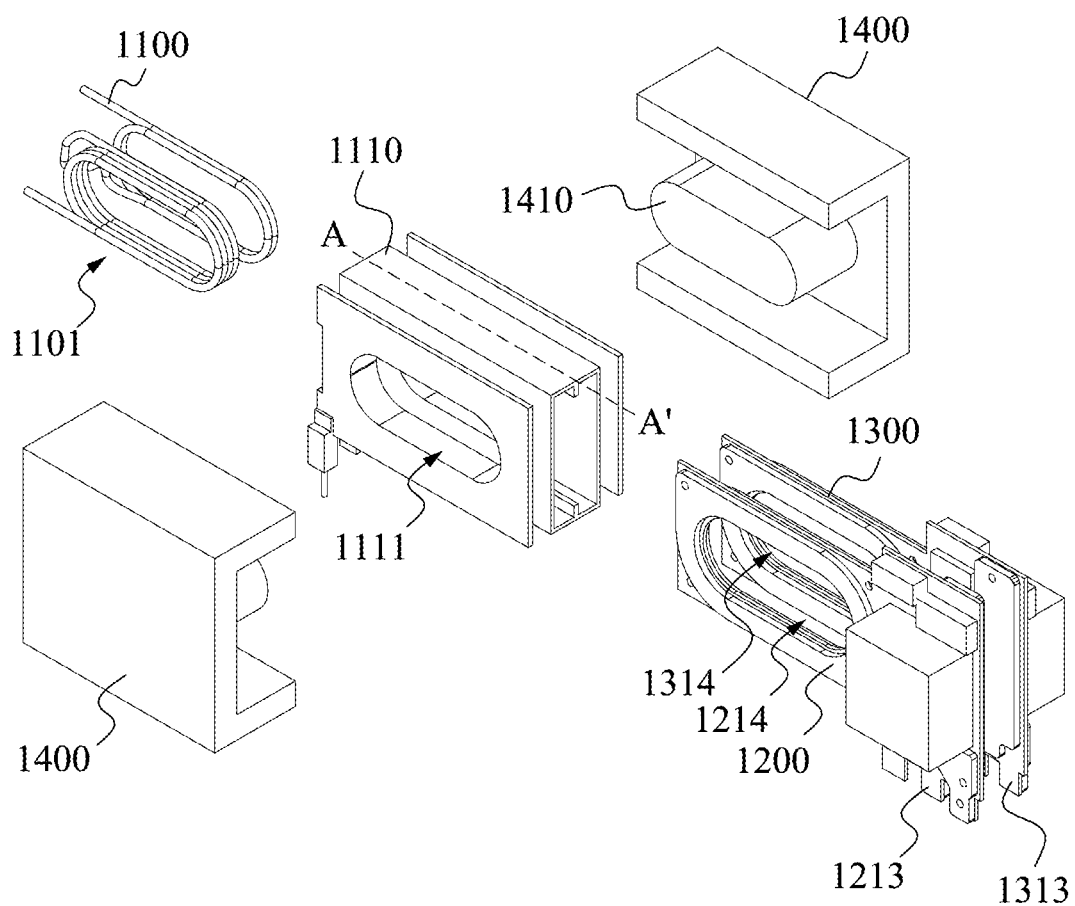

As shown in FIG. 19 and FIG. 20, the front side magneto-sensitive unit 1100 has a first hollow portion 1101. For example, the front side magneto-sensitive unit 1100 may be a copper wire winding, a copper piece winding, or a winding is formed by a copper foil of a printed circuit board, but is not limited thereto, or may be a primary winding 310 as described in FIG. 2 or FIG. 7.

The first voltage conversion unit 1200 includes a second hollow portion 1214, and the second voltage conversion unit 1300 includes a third hollow portion 1314. The voltage conversion module 1004 further includes a core group 1400 having a centre leg 1410 installed in the second hollow portion 1214, the third hollow portion 1314, and the first hollow portion 1101, as described above.

The bobbin 1110 is used to combine the front side magneto-sensitive unit 1100, the first voltage conversion unit 1200, the second voltage conversion unit 1300, and the core group 1400 to form a voltage conversion module 1004. The bobbin 1110 has a containment space that houses the front side magneto-sensitive unit 1100, the first voltage conversion unit 1200, and the second voltage conversion unit 1300. The bobbin 1110 has a through hole 1111 for receiving the centre leg 1410.

Figure 21:
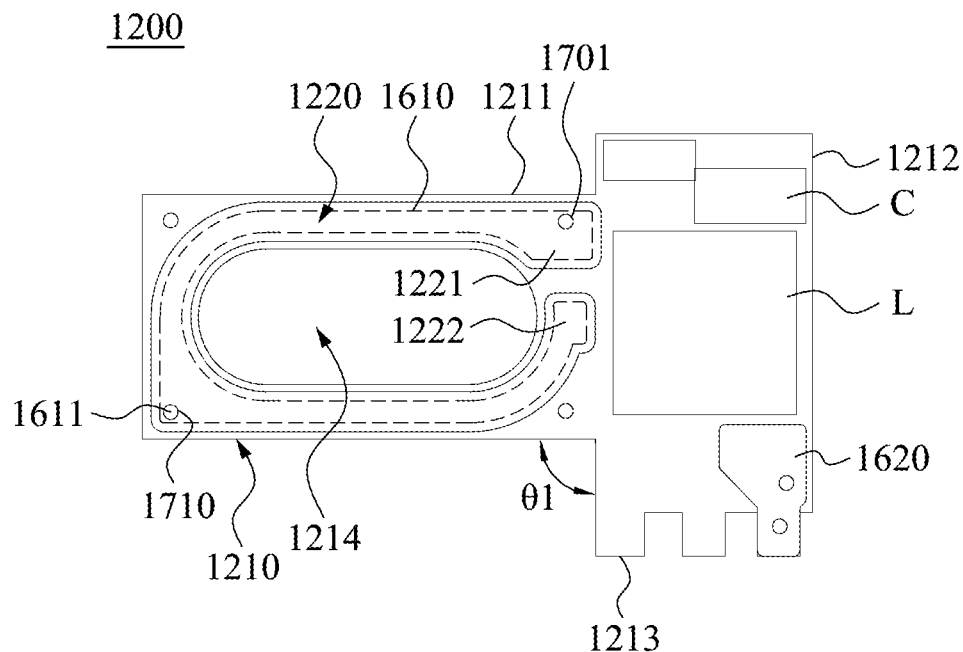
Figure 22:
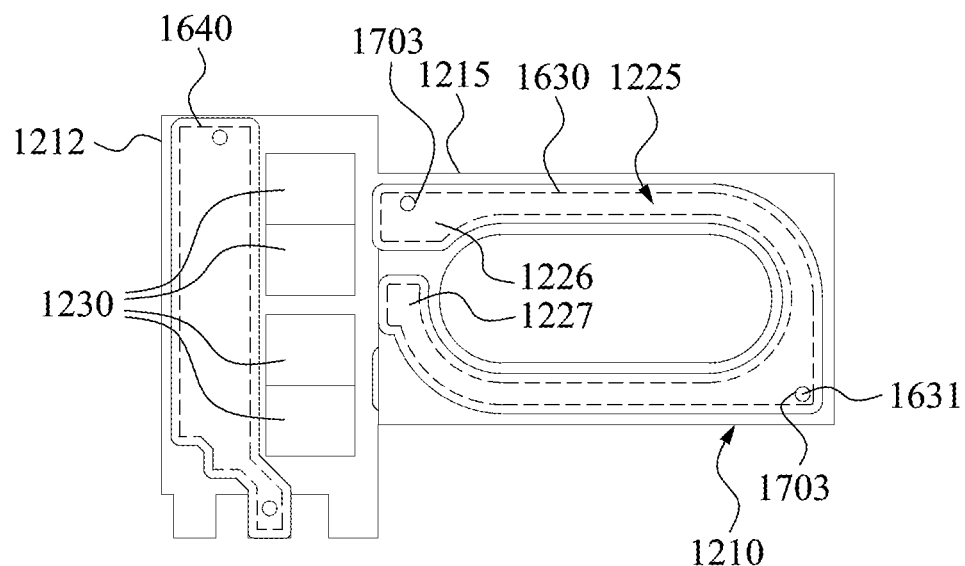

As shown in FIG. 21 and FIG. 22, the first voltage conversion unit 1200 includes a first conductive substrate 1210, a first rear side magnetic sensitive layer 1220, a third rear side magnetic sensitive layer 1225, and a first rectifying unit 1230.

The first conductive substrate 1210 has a first conductive region 1212 and a first output portion 1213, and two sides of the first conductive substrate 1210 have a first magnetic sensitive region 1211 and a third magnetic sensitive region 1215, respectively. The first magnetic sensitive region 1211 and the third magnetic sensitive region 1215 have a second hollow portion 1214. The first magnetic sensitive region 1211 and the third magnetic sensitive region 1215 are connected to or electrically connected to the first conductive region 1212. The first conductive region 1212 and the first output portion 1213 are connected or electrically connected.

The first rear side magnetic sensitive layer 1220 is arranged on the first magnetic sensitive region 1211 in an annular manner, and the first rear side magnetic sensitive layer 1220 has a first open end 1221 and a second open end 1222 that are not connected to each other. The third rear side magnetic sensitive layer 1225 is arranged on the third magnetic sensitive region 1215 in an annular manner, and the third rear side magnetic sensitive layer 1225 has a third open end 1226 and a fourth open end 1227 that are not connected to each other. The first rear side magnetic sensitive layer 1220 is electrically connected to the third rear side magnetic sensitive layer 1225 through the first conductive substrate 1210. The first rear side magnetic sensitive layer 1220 and third rear side magnetic sensitive layer 1225 for interacting with the front side magneto-sensitive unit 1100 to produce a first induced current. In other words, the first rear side magnetic sensitive layer 1220 of the first magnetic sensitive region 1211 and the third rear side magnetic sensitive layer 1225 of the third magnetic sensitive region 1215 receive the magnetic energy signal of the front side magneto-sensitive unit 1100 to generate an energy signal. The energy signal is conducted to the printed circuit board 1001 via the first conductive region 1212 and the first output portion 1213.

The first rectifying unit 1230 is disposed on the first conductive region 1212 and is electrically connected to the first rear side magnetic sensitive layer 1220 and the third rear side magnetic sensitive layer 1225, to rectify the first induced current to a first current. The first output portion 1213 is electrically connected to the first rectifying unit 1230, and the first output portion 1213 outputs the first current. A filter unit composed of an inductor L and/or a capacitor C may be provided between the first output portion 1213 and the first rectifying unit 1230 to filter the first current. In one embodiment of the present invention, the first rectifying unit 1230 may comprise at least one switch for rectification in a switched manner.

The first magnetic sensitive region 1211 is provided with a metal sheet 1610, and the metal sheet 1610 is bonded to the first rear side magnetic sensitive layer 1220 to increase the heat dissipation and current tolerance. The first magnetic sensitive region 1211 is provided with two first positioning holes 1701 which are diagonally to each other. The metal sheet 1610 includes a positioning structure 1611 for engaging with the first positioning hole 1701. For example, the positioning structure 1611 may be a bump that is locally punched on the metal sheet 1610. On the other hand, a metal sheet 1620 is disposed on one side of the first conductive region 1212, and the metal sheet 1620 serves to increase the heat dissipation and current resistance.

The third magnetic sensitive region 1215 is provided with a metal sheet 1630, and the metal sheet 1630 is bonded to the third rear side magnetic sensitive layer 1225 to increase the heat dissipation and current tolerance. The third magnetic sensitive region 1215 is provided with two third positioning holes 1703 which are diagonally to each other. The metal sheet 1630 includes a positioning structure 1631 for engaging with the third positioning hole 1703. For example, the positioning structure 1631 may be a bump that is locally punched on the metal sheet 1630. On the other hand, a metal sheet 1640 is disposed on the other side of the first conductive region 1212 for increasing the heat dissipation and current resistance. The first positioning hole 1701 and the third positioning hole 1703 are offset from each other, where the two first positioning holes 1701 and the two third positioning holes 1703 are respectively diagonally opposed to each other, so that the positioning structure 1611 is engaged with the positioning structure 1631, and to enhance structural stability.

The first output portion 1213 is located in the first conductive region 1212. It has a first angle Θ1 between the first magnetic sensitive region 1211 and the first output portion 1213, where the first angle Θ1 is greater than 0 degrees and less than 180 degrees.

The structure and circuit characteristics of the second voltage conversion unit 1300 are substantially the same as those of the first voltage conversion unit 1200 and are not repeated herein. It is important to note that the first voltage conversion unit 1200 and the second voltage conversion unit 1300 may be identical or may be arranged on opposing side of the mirror manner, or are individually separate circuit layout designs, all of which fall within the scope of the present invention.

Figure 23:
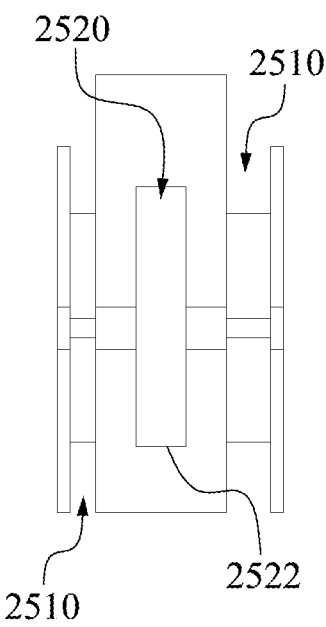
Figure 24:
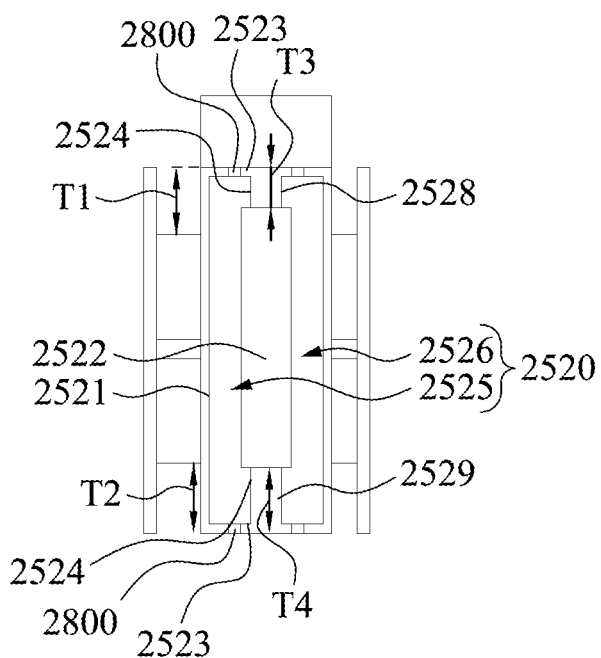

As shown in FIG. 23 and FIG. 24, the bobbin 1110 has a first accommodating part 2510, a second accommodating part 2520, and a first opening 2521, wherein the second accommodating part 2520 has a second opening 2522. The first opening 2521 and the second opening 2522 are connected to each other, and the first opening 2521 is larger than the second opening 2522. In use, the first accommodating part 2510 is used to accommodate the front side magneto-sensitive unit 1100, and the second accommodating part 2520 accommodates the first voltage conversion unit 1200 and/or the second voltage conversion unit 1300. And the second accommodating part 2520 improves heat dissipation via first opening 2521 and the second opening 2522.

The upper and/or lower edges of the first opening 2521 have a stopper 2523 against the first voltage conversion unit 1200 or the second voltage conversion unit 1300.

The upper and/or lower edges of the second opening 2522 have a stopper 2524. The stopper 2524 of the upper and/or lower edge of the second opening 2522 is disposed against the magnetic sensitive regions of the first voltage conversion unit 1200 or the second voltage conversion unit 1300.

The upper and/or lower edges of the second accommodating part 2520 are provided with divider blocks 2528 and 2529 which divide the second accommodating part 2520 into two slots 2525 and 2526. The two slots 2525 and 2526 provide the first voltage conversion unit 1200 and the second voltage conversion unit 1300 to be inserted respectively.

Refer to FIG. 20 and FIG. 24, a first height T1 is between the upper edge of the through hole 1111 in FIG. 20 and the upper wall of the second accommodating part 2520. A second height T2 is between the lower edge of the through hole 1111 and the lower wall of the second accommodating part 2520. The divider block 2528 has a third height T3. The divider block 2529 has having a fourth height T4. The third height T3 of the divider block 2528 is less than the first height T1 so as to prevent the divider block 2528 from penetrating through the through hole 1111 and affecting the assembly of the core group 1400. The fourth height T4 of the divider block 2529 is less than the second height T2, thereby preventing the divider block 2529 from penetrating through the through hole 1111 and affecting the assembly of the core group 1400.

The upper and/or lower edges of the first opening 2521 have a notch 2800 for positioning or fixing the first voltage conversion unit 1200 and the second voltage conversion unit 1300.

Figure 25:
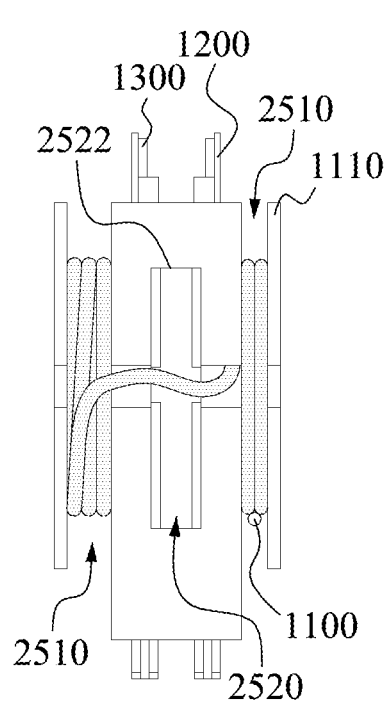
Figure 26:
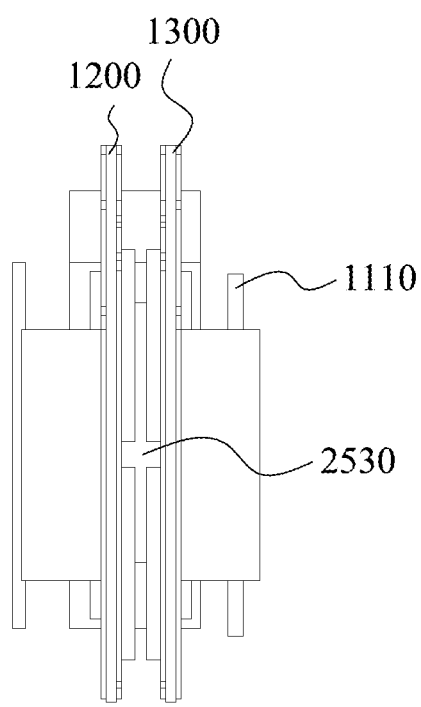

As shown in FIG. 25 and FIG. 26, the front side magneto-sensitive unit 1100, the first voltage conversion unit 1200 and the second voltage conversion unit 1300 are assembled together with the bobbin 1110. The front side magneto-sensitive unit 1100 is installed in the first accommodating part 2510, the first voltage conversion unit 1200 is inserted in the slot 2525 of the second accommodating part 2520, and the second voltage conversion unit 1300 is inserted in the slot 2526 of the second accommodating part 2520. A gap 2530 is formed between the first voltage conversion unit 1200 and the second voltage conversion unit 1300. The stopper 2523 of the first opening 2521 is disposed against the first voltage conversion unit 1200 and the second voltage conversion unit 1300, and magnetic sensitive regions of the first magnetic conversion unit 1200 and the second voltage conversion unit 1300 are disposed against the stopper 2524 of the second opening 2522.

Figure 27:
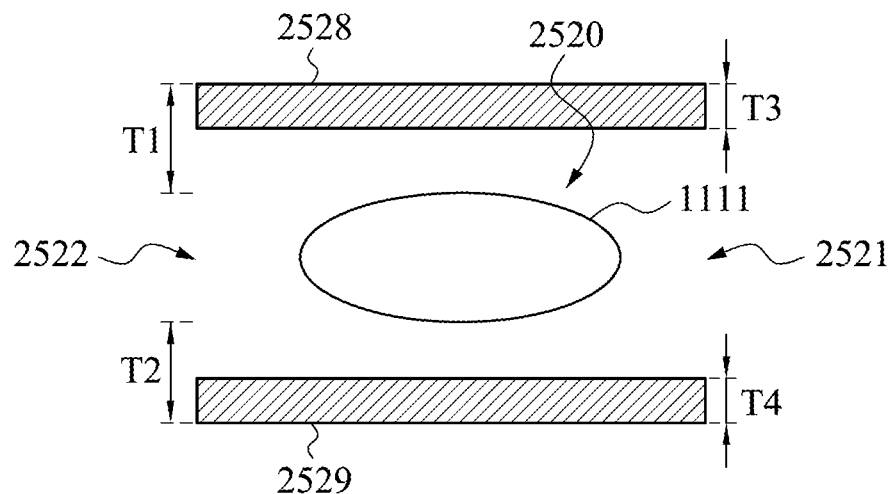

Referring to FIG. 27, there is a schematic cross-sectional view of the A-A' section of the bobbin 1110 in FIG. 20, where the hatching line A-A' corresponds to the position where the second accommodating part 2520 is located at the divider blocks 2528 and 2529. As shown in FIG. 27, after the centre leg 1410 penetrates the through hole 1111, it can block a portion of the gap 2530 (see FIG. 26), but since the first height T1 is greater than the third height T3 and the second height T2 is greater than the fourth height T4. The upper edge of the through hole 1111 with the lower edge of the divider block 2528, and the lower edge of the through hole 1111 with the upper edge of the divider block 2529 form the upper and lower passages, respectively. There is a distance between the second opening 2522 and an end of the through hole 1111 close to the second opening 2522, so that the air flow can flow between the first opening 2521 and the second opening 2522 via the upper or lower passages in the gap 2530 (see FIG. 26) to increase the heat dissipation effect.

Figures 28, 29:
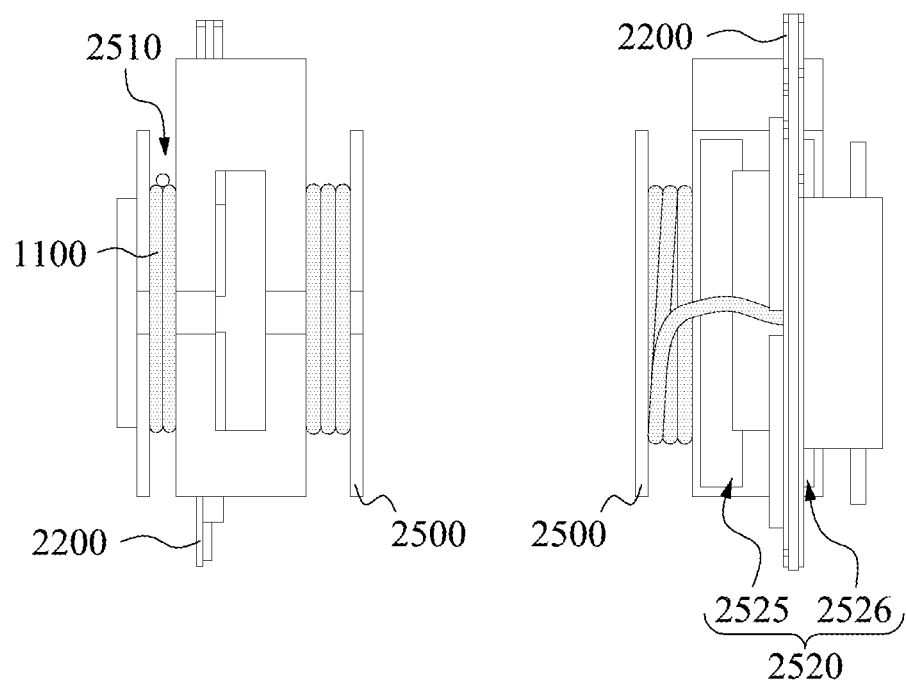

It should be understood that although the above-described embodiments have been described in terms of the first voltage conversion unit 1200 and the second voltage conversion unit 1300, which are adjacent to the slots inserted into a space, but this does not limit the number of the voltage conversion units of the present invention. In other embodiments of the present invention, the voltage conversion unit 2200 is individually inserted in the slot 2525 or slot 2526 of the second accommodating part 2520 of the bobbin 1110, as shown in FIG. 28 and FIG. 29. Through this alone manner can also be used to achieve the same or similar efficacy.

Figure 30:
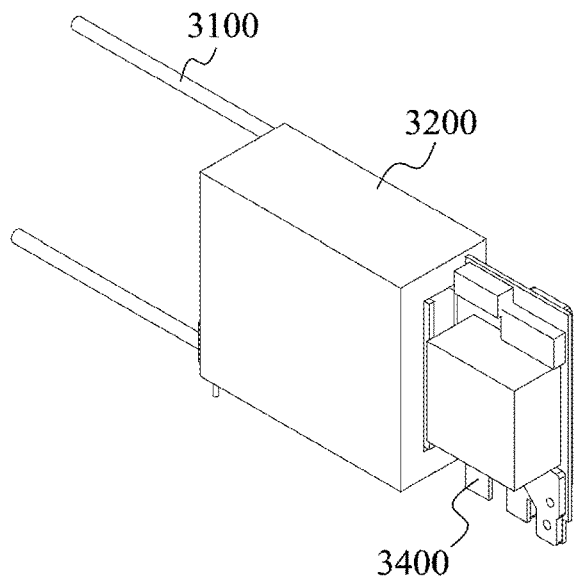
Figure 31:
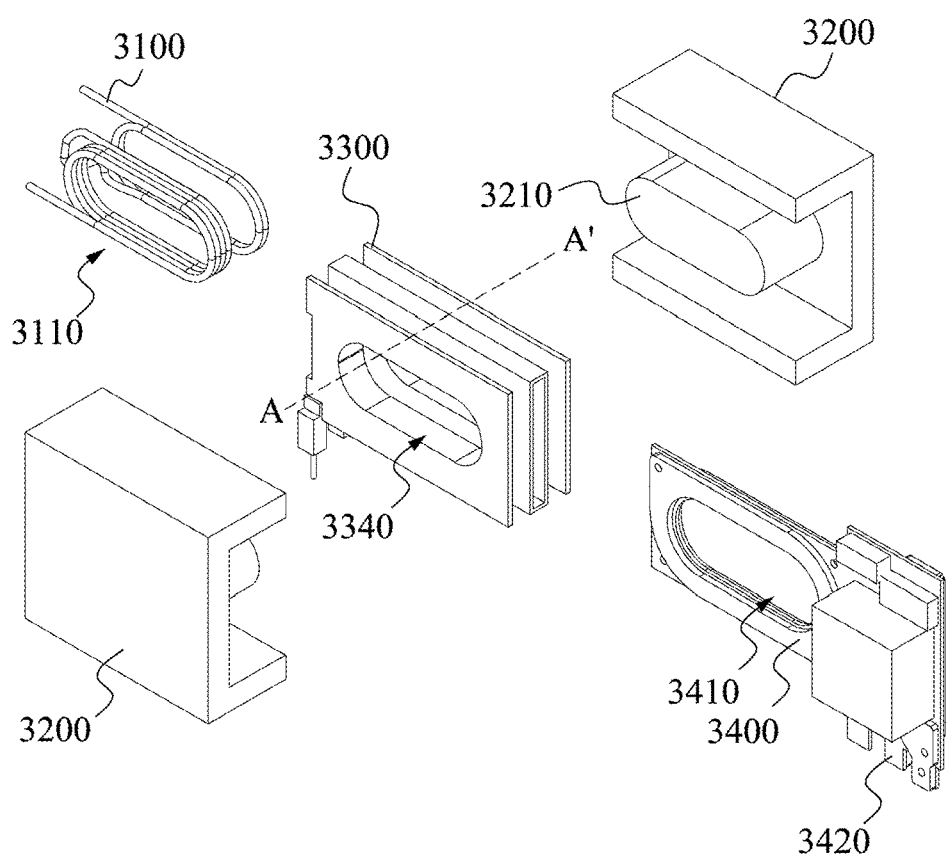

In another embodiment of the present invention, as shown in FIG. 30 and FIG. 31, the voltage conversion module 3000 includes a front side magneto-sensitive unit 3100, a core group 3200, a bobbin 3300, and a voltage conversion unit 3400. The front side magneto-sensitive unit 3100 receives the electric energy to generate a magnetic energy signal and isolatedly transmits the magnetic energy signal. The voltage conversion unit 3400 and the front side magneto-sensitive unit 3100 form a magnetic loop, and the voltage conversion unit 3400 includes an output portion 3420 inserted into the printed circuit board. The voltage conversion unit 3400 receives the magnetic energy signal sent by the front side magneto-sensitive unit 3100 and processes the magnetic energy signal as an energy signal. The output portion 3420 conducts the processed energy signal to the printed circuit board.

In use, the front side magneto-sensitive unit 3100 is used to receive the voltage and generate magnetic energy. The voltage conversion unit 3400 and the front side magneto-sensitive unit 3100 form a magnetic loop to magnetize each other to produce an induced current and rectify the induced current as a rectified current. The output portion 3420 is used to conduct the rectified current to the printed circuit board.

The front side magneto-sensitive unit 3100 has a first hollow portion 3110. For example, the front side magneto-sensitive unit 3100 may be a copper wire winding, a copper piece winding, or a winding is formed by the copper foil of a printed circuit board, but is not limited thereto, or may be a primary winding 310 as described in FIG. 2 or FIG. 7.

The voltage conversion unit 3400 includes a second hollow portion 3410. The core group 3200 having a centre leg 3210 installed in the second hollow portion 3410, and the first hollow portion 3110 as described above.

The bobbin 3300 is used to combine the front side magneto-sensitive unit 3100, the voltage conversion unit 3400, and the core group 3200 to form a voltage conversion module 3000. The bobbin 3300 has a containment space that houses the front side magneto-sensitive unit 3100 and the voltage conversion unit 3400. The bobbin 3300 has a through hole 3340 for receiving the centre leg 3210.

The structure and circuit characteristics of the voltage conversion unit 3400 are substantially the same as those of the first voltage conversion unit 1200 and are not repeated herein.

As shown in FIG. 32 and FIG. 33, the bobbin 3300 has a first accommodating part 3310, a second accommodating part 3320, and a first opening 3330, wherein the second accommodating part 3320 has a second opening 3321. The first opening 3330 and the second opening 3321 are connected to each other, and the first opening 3330 is larger than the second opening 3321. In use, the first accommodating part 3310 is used to accommodate the front side magneto-sensitive unit 3100, and the second accommodating part 3320 accommodates the voltage conversion unit 3400. The heat generated from the voltage conversion unit 3400 is dissipated via the first opening 3330 and the second opening 3321.

The upper and/or lower edges of the first opening 3330 have a stopper 3331 against the voltage conversion unit 3400.

The upper and/or lower edges of the second opening 3321 have a stopper 3323. The stopper 3323 of the upper and/or lower edge of the second opening 3321 is disposed against the magnetic sensitive regions of the voltage conversion unit 3400.

The second accommodating part 3320 has a slot 3322. The slot 3322 provides the voltage conversion unit 3400 to be inserted therein.

The upper and/or lower edges of the first opening 3330 have a notch 3332 for positioning or fixing the voltage conversion unit 3400.

As shown in FIG. 34 and FIG. 35, the front side magneto-sensitive unit 3100, and the voltage conversion unit 3400 are assembled together with the bobbin 3300. The front side magneto-sensitive unit 3100 is installed in the first accommodating part 3310, and the voltage conversion unit 3400 is inserted in the slot 3322 of the second accommodating part 3320. Wherein the stopper 3331 of the first opening 3330 is disposed against the voltage conversion unit 3400, and the magnetic sensitive region of voltage conversion unit 3400 is disposed against the stopper 3323 of the second opening 3321.

Figure 36:
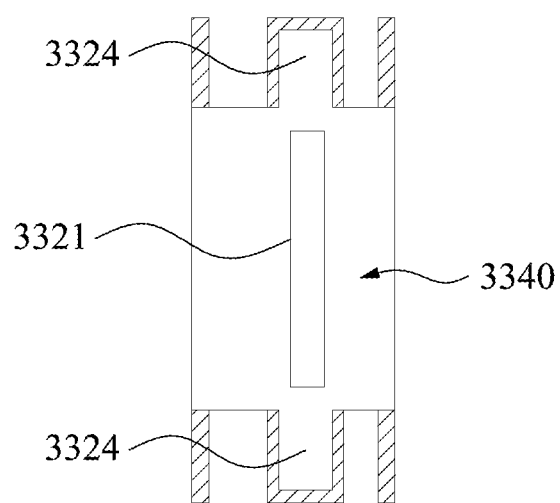

When the voltage conversion unit 3400 is inserted into the slot 3322, a gap 3324 is formed between the inner wall of the second accommodating part 3320 and the voltage conversion unit 3400. See FIG. 36, which is a schematic view of the A-A' section of the bobbin 3300 in FIG. 31. In FIG. 35 and FIG. 36, after the centre leg 3210 penetrates the through hole 3340, it can partially block the gap 3324, but the gap 3324 is not completely blocked by the centre leg 3210. There is a distance between the second opening 3321 and an end of the through hole 3340 close to the second opening 3321, so that the air flow can flow between the first opening 3330 and the second opening 3321 via the gap 3324 to increase the heat dissipation effect.

Figure 37:
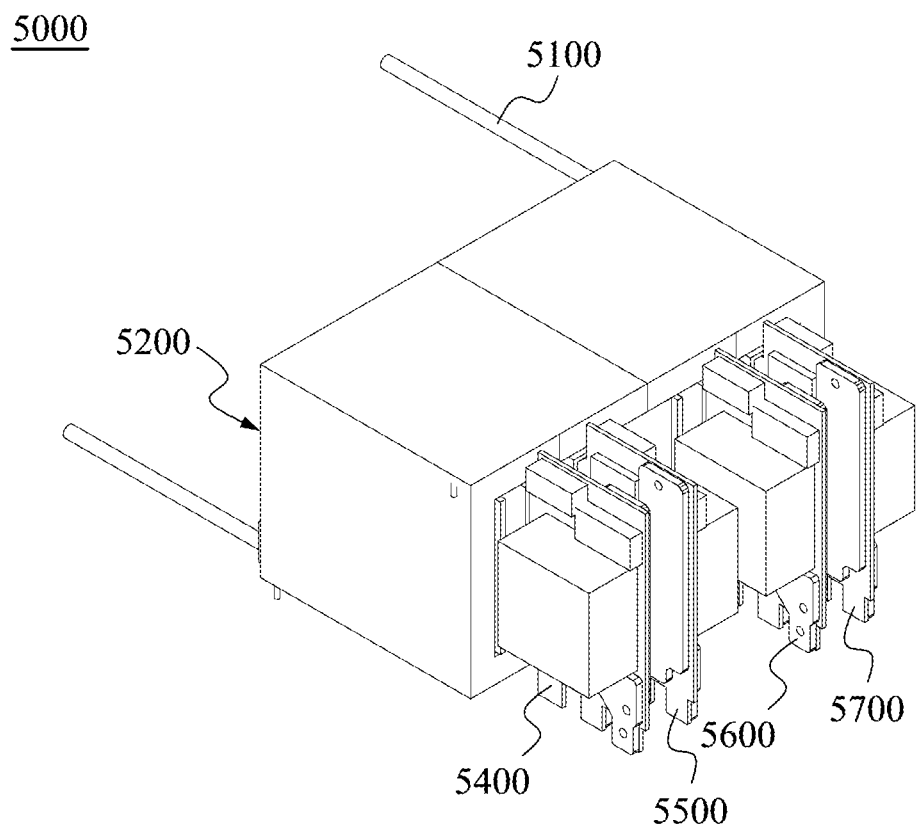
FIG. 37 to FIG. 43 illustrate a voltage conversion module according to yet another embodiment of the present invention.
Figure 38:
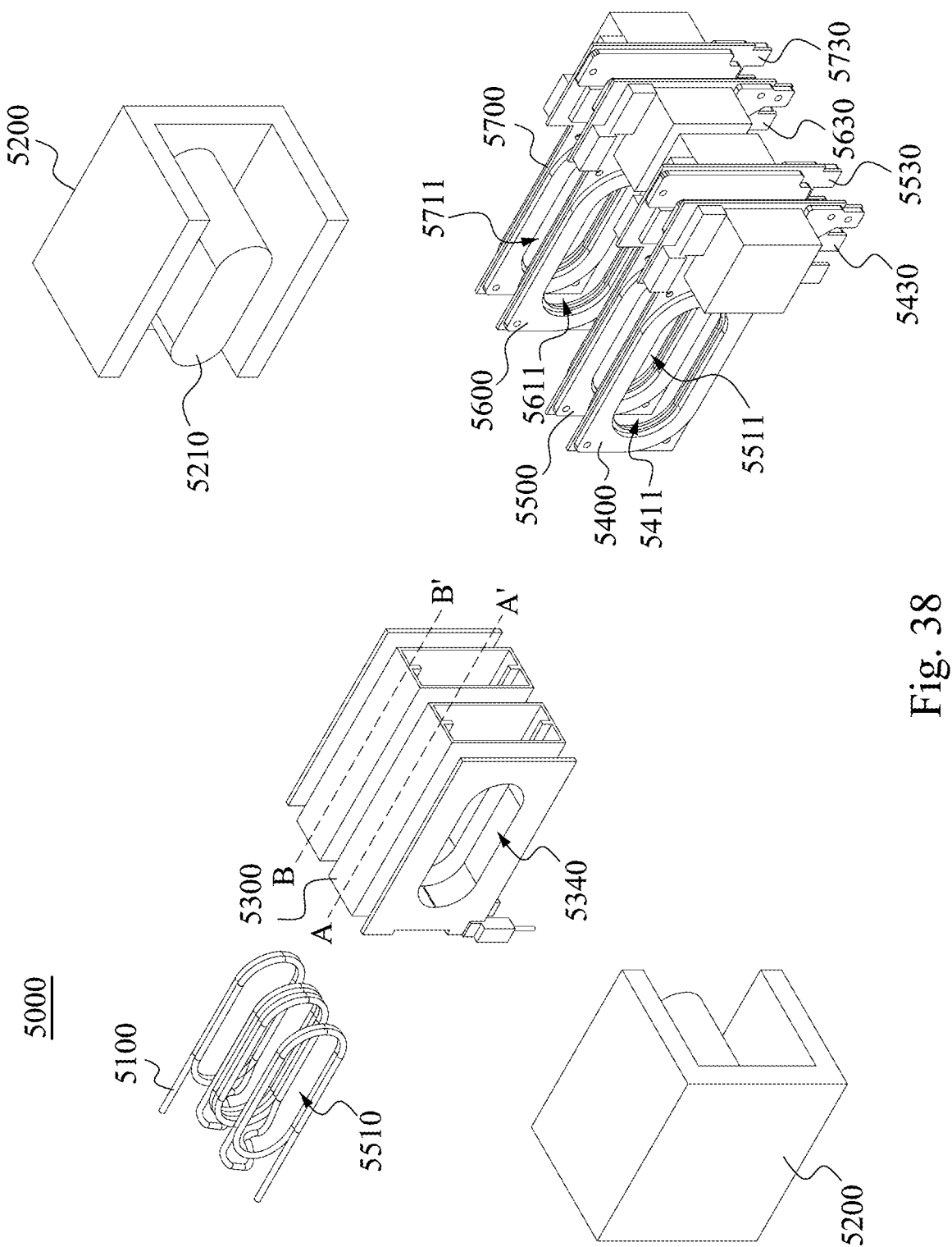

In another embodiment of the present invention, as shown in FIG. 37 and FIG. 38, the voltage conversion module 5000 includes a front side magneto-sensitive unit 5100, a core group 5200, a bobbin 5300, a first voltage conversion unit 5400, a second voltage conversion unit 5500, a third voltage conversion unit 5600 and a fourth voltage conversion unit 5700. The core group 5200 has a centre leg 5210. The front side magneto-sensitive unit 5100 receives the electric energy to generate a magnetic energy signal and isolatedly transmits the magnetic energy signal. The first voltage conversion unit 5400 and the front side magneto-sensitive unit 5100 form a magnetic loop, and the first voltage conversion unit 5400 includes a first output portion 5430 inserted into the printed circuit board. The second voltage conversion unit 5500 and the front side magneto-sensitive unit 5100 form a magnetic loop, and the second voltage conversion unit 5500 includes a second output portion 5530 inserted into the printed circuit board. The third voltage conversion unit 5600 and the front side magneto-sensitive unit 5100 form a magnetic loop, and the third voltage conversion unit 5600 includes a third output portion 5630 inserted into the printed circuit board. The fourth voltage conversion unit 5700 and the front side magneto-sensitive unit 5100 form a magnetic loop, and the third voltage conversion unit 5600 includes a fourth output portion 5730 inserted into the printed circuit board. The first voltage conversion unit 5400, the second voltage conversion unit 5500, the third voltage conversion unit 5600 and/or the fourth voltage conversion unit 5700 receives the magnetic energy signal sent by the front side magneto-sensitive unit 5100 and processes the magnetic energy signal as an energy signal. The first output portion 5430, the second output portion 5530, the third output portion 5630, and the fourth output portion 5730 conduct the processed energy signal to the printed circuit board.

In use, the front side magneto-sensitive unit 5100 is used to receive the voltage and generate magnetic energy. The first voltage conversion unit 5400, the second voltage conversion unit 5500, the third voltage conversion unit 5600, the fourth voltage conversion unit 5700 and the front side magneto-sensitive unit 5100 form a magnetic loop to magnetize each other to produce a induced current and rectify the induced current as a rectified current. The first output portion 5430, the second output portion 5530, the third output portion 5630, and the fourth output portion 5730 are used to conduct the rectified current to the printed circuit board.

The front side magneto-sensitive unit 5100 has a first hollow portion 5110. For example, the front side magneto-sensitive unit 5100 may be a copper wire winding, a copper piece winding, or a winding is formed by a copper foil of a printed circuit board, but is not limited thereto, or may be a primary winding 310 as described in FIG. 2 or FIG. 7.

The first voltage conversion unit 5400 includes a second hollow portion 5411. The second voltage conversion unit 5500 includes a third hollow portion 5511. The third voltage conversion unit 5600 includes a fourth hollow portion 5611. The fourth voltage conversion unit 5700 includes a fifth hollow portion 5711. The core group 5200 having a centre leg 5210 installed in the second hollow portion 5411, the third hollow portion 5511, the fourth hollow portion 5611, the fifth hollow portion 5711, and the first hollow portion 5110 as described above.

The bobbin 5300 is used to combine the front side magneto-sensitive unit 5100, the first voltage conversion unit 5400, the second voltage conversion unit 5500, the third voltage conversion unit 5600, the fourth voltage conversion unit 5700 and the core group 5200 to form a voltage conversion module 5000. The bobbin 5300 has a containment space that houses front side magneto-sensitive unit 5100, the first voltage conversion unit 5400, the second voltage conversion unit 5500, the third voltage conversion unit 5600 and the fourth voltage conversion unit 5700. The bobbin 5300 has a through hole 5340 for receiving the centre leg 5210.

The structure and circuit characteristics of the first voltage conversion unit 5400, the second voltage conversion unit 5500, the third voltage conversion unit 5600 and the fourth voltage conversion unit 5700 are substantially the same as those of the first voltage conversion unit 1200 and are not repeated herein. It is important to note that the first voltage conversion unit 5400, the second voltage conversion unit 5500, the third voltage conversion unit 5600 and the fourth voltage conversion unit 5700 may be identical or may be arranged on opposing side of the mirror manner, or are individually separate circuit layout designs, all of which fall within the scope of the present invention.

Figure 39:
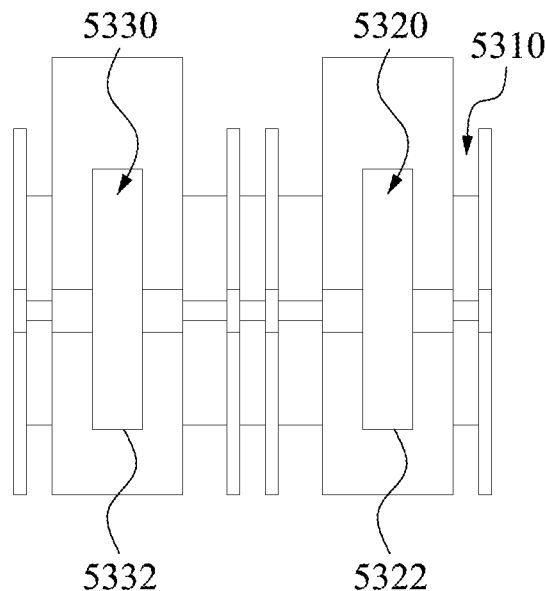
Figure 40:
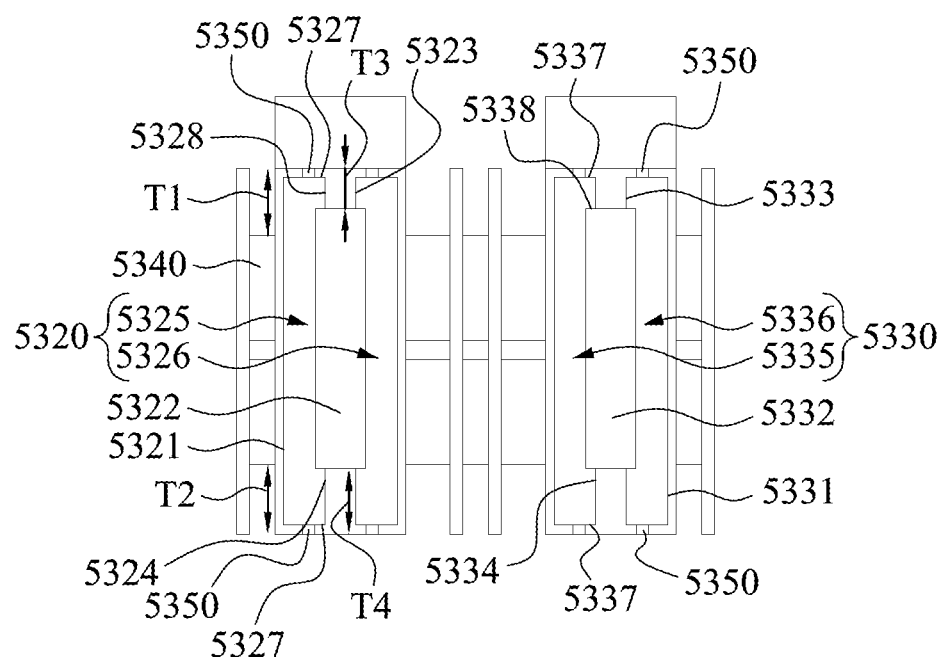

As shown in FIG. 39 and FIG. 40, the bobbin 5300 has a first accommodating part 5310, a second accommodating part 5320, and a third accommodating part 5330. The second accommodating part 5320 has a first opening 5321 and a second opening 5322. The first opening 5321 and the second opening 5322 are connected to each other, and the first opening 5321 is larger than the second opening 5322. The third accommodating part 5330 has a third opening 5331 and a fourth opening 5332. The third opening 5331 and the fourth opening 5332 are connected to each other, and the third opening 5331 is larger than the fourth opening 5332. In use, the first accommodating part 5310 is used to accommodate the front side magneto-sensitive unit 5100, and the second accommodating part 5320 accommodates the first voltage conversion unit 5400 and/or the second voltage conversion unit 5500. And the second accommodating part 5320 improves heat dissipation via the first opening 5321 and the second opening 5322. The third accommodating part 5330 accommodates the third voltage conversion unit 5600 and/or the fourth voltage conversion unit 5700. And the third accommodating part 5330 improves heat dissipation via the third opening 5331 and the fourth opening 5332.

The upper and/or lower walls of the first opening 5321 have divider blocks 5323 and 5324 which divide the second accommodating part 5320 into two slots 5325 and 5326. The two slots 5325 and 5326 provide the first voltage conversion unit 5400 and the second voltage conversion unit 5500 to be inserted respectively.

The upper and/or lower walls of the third opening 5331 have divider blocks 5333 and 5334 which divide the third accommodating part 5330 into two slots 5335 and 5336. The two slots 5335 and 5336 provide the third voltage conversion unit 5600 and the fourth voltage conversion unit 5700 to be inserted respectively.

The upper and/or lower edges of the first opening 5321 have a stopper 5327 against the first voltage conversion unit 5400 and/or the second voltage conversion unit 5500.

The upper and/or lower edges of the second opening 5322 have a stopper 5328 against the first voltage conversion unit 5400 and/or the second voltage conversion unit 5500.

The upper and/or lower edges of the third opening 5331 have a stopper 5337 against the third voltage conversion unit 5600 and/or the fourth voltage conversion unit 5700.

The upper and/or lower edges of the fourth opening 5332 have a stopper 5338 against the third voltage conversion unit 5600 and/or the fourth voltage conversion unit 5700.

Refer to FIG. 38 and FIG. 40, a first height T1 is between the upper edge of the through hole 5340 in FIG. 40 and the upper wall of the second accommodating part 5320. A second height T2 is between the lower edge of the through hole 5340 and the lower wall of the second accommodating part 5320. The divider block 5323 has a third height T3. The divider block 5324 has having a fourth height T4. The third height T3 of the divider block 5323 is less than the first height T1 so as to prevent the divider block 5323 from penetrating through the through hole 5340 and affecting the assembly of the core group 5200. The fourth height T4 of the divider block 5324 is less than the second height T2, thereby preventing the divider block 5324 from penetrating through the through hole 5340 and affecting the assembly of the core group 5200.

The upper and/or lower edges of the first opening 5321 and the third opening 5331 have notches 5350 for positioning or fixing the first voltage conversion unit 5400, the second voltage conversion unit 5500, the third voltage conversion unit 5600 and the fourth voltage conversion unit 5700.

Figure 41:
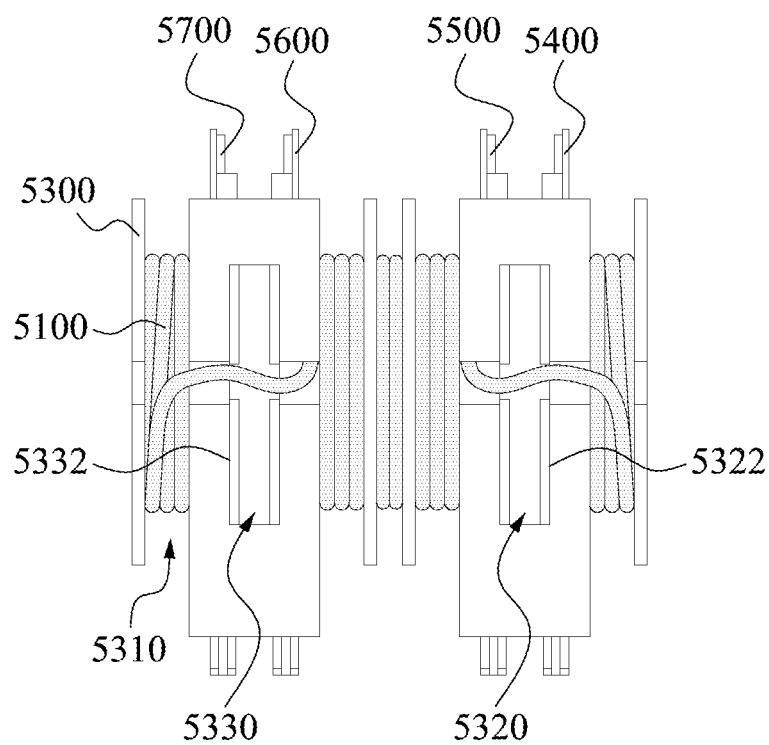
Figure 42:
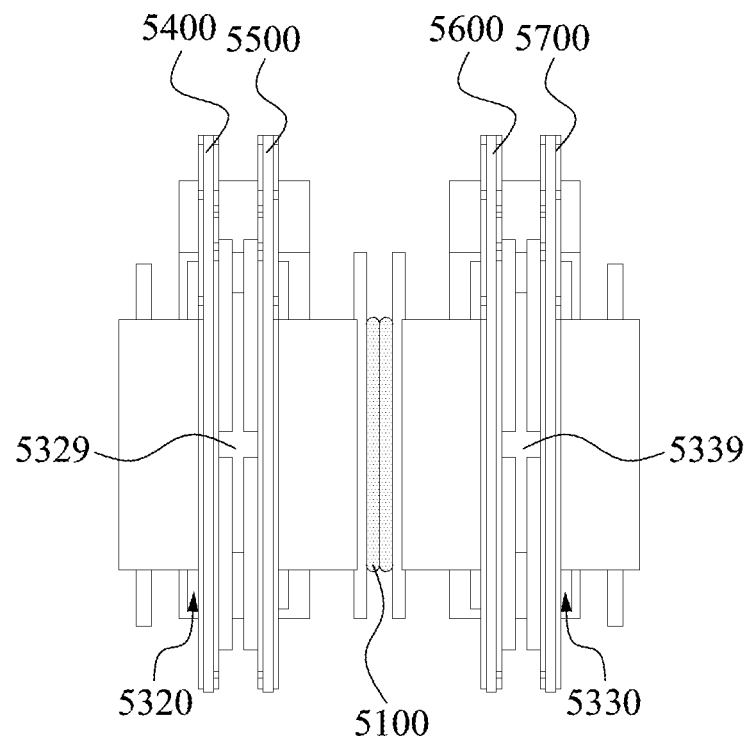

As shown in FIG. 41 and FIG. 42, the front side magneto-sensitive unit 5100, the first voltage conversion unit 5400, the second voltage conversion unit 5500, the third voltage conversion unit 5600 and the fourth voltage conversion unit 5700 are assembled together with the bobbin 5300. The front side magneto-sensitive unit 5100 is installed in the first accommodating part 5310. The first voltage conversion unit 5400 and the second voltage conversion unit 5500 are inserted in the slots 5325 and 5326 of the second accommodating part 5320. A gap 5329 is formed between the first voltage conversion unit 5400 and the second voltage conversion unit 5500. The third voltage conversion unit 5600 and the fourth voltage conversion unit 5700 are inserted in the slots 5335 and 5336 of the third accommodating part 5330. A gap 5339 is formed between the third voltage conversion unit 5600 and the fourth voltage conversion unit 5700. The stopper 5327 of the first opening 5321 is disposed against the first voltage conversion unit 5400 and the second voltage conversion unit 5500, and magnetic sensitive regions of the first voltage conversion unit 5400 and the second voltage conversion unit 5500 are disposed against the stopper 5328 of the second opening 5322. The stopper 5337 of the third opening 5331 is disposed against the third voltage conversion unit 5600 and the fourth voltage conversion unit 5700, and magnetic sensitive regions of the third voltage conversion unit 5600 and the fourth voltage conversion unit 5700 are disposed against the stopper 5338 of the fourth opening 5332.

Figure 43:
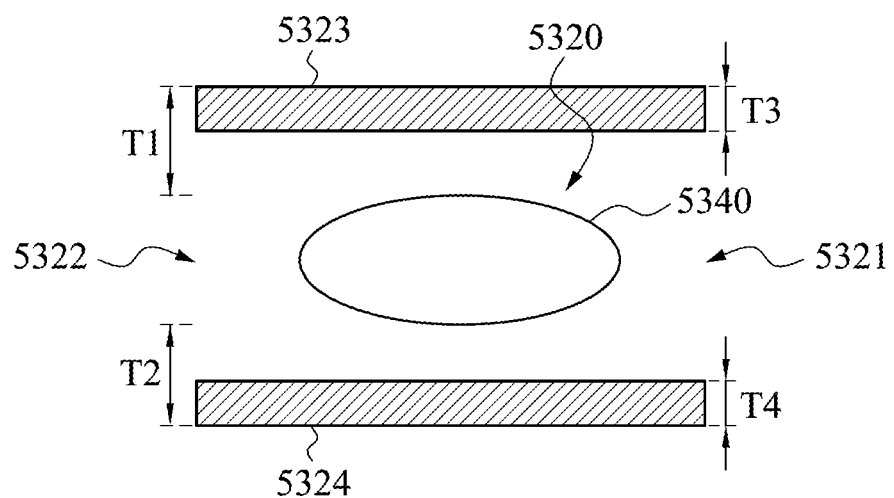

Referring to FIG. 43, there is a schematic cross-sectional view of the A-A' section of the bobbin 5300 in FIG. 38, where the hatching line A-A' corresponds to the position where the second accommodating part 5320 is located at the divider blocks 5323 and 5324. As shown in FIG. 43, after the centre leg 5210 penetrates the through hole 5340, it can block a portion of the gap 5329, but since the first height T1 is greater than the third height T3 and the second height T2 is greater than the fourth height T4, the upper edge of the through hole 5340 with the lower edge of the divider block 5323 and the lower edge of the through hole 5340 with the upper edge of the divider block 5324 form the upper and lower passages, respectively. There is a distance between the second opening 5322 and an end of the through hole 5340 close to the second opening 5322, so that the air flow can flow between the first opening 5321 and the second opening 5322 via the upper or lower passages in the gap 5329 to increase the heat dissipation effect.

In the present embodiment, the structure of the third accommodating part 5330 is substantially similar to that of the second accommodative part 5320. After the centre leg 5210 penetrates the through hole 5340, the air flow can flow between the third opening 5331 and the fourth opening 5332 via the upper or lower passages in the gap 5339 to increase the heat dissipation effect.

It should be noted that the embodiments of the present invention can be combined with different amounts of voltage conversion units depending on the different requirements such as space, environment of use, output power, or so forth. For example, one voltage conversion unit is placed in a single accommodating space, three or four voltage conversion units are placed in two accommodating spaces, or more voltage conversion units are placed in more accommodating spaces. Those with ordinary skill in the art may flexibly design depending on the desired application.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A power conversion system comprising:
    a switching module;
    a resonant module;
    an integrated power-converting module comprising:
        a primary winding;
        a plurality of power-converting units arranged in a parallel manner and each of the power-converting units comprising:
            a circuit board having a base portion and an expending portion connected to the base portion, a penetrating hole formed on the expending portion;
            a secondary winding disposed on the expending portion; and
            a synchronous rectifying unit disposed on the base portion, and electrically connected to the circuit board and the secondary winding, wherein the synchronous rectifying unit is configured to receive a converted electric power from the secondary winding; and
        a magnetic core;
    an output-controlling device comprising a controller and a plurality of output-controlling modules electrically connected to the controller, wherein each of the power-converting units is electrically connected to each of the output-controlling modules respectively; and
    a bobbin including a main body, a plurality of winding portions, and a plurality of receiving portions, wherein each of the receiving portions has a slot, wherein the main body has a first channel, and the winding portions and the receiving portions are arranged in a staggered manner.

2. The power conversion system of claim 1, wherein the power conversion system further comprises a main circuit board, and the switching module, the resonant module, the integrated power-converting module and the output-controlling device are disposed on the main circuit board, wherein one end of the base portion is connected to the main circuit board.

3. The power conversion system of claim 1, wherein each of the output-controlling modules comprises an output switch, and each of the output switches is electrically connected to each of the synchronous rectifying units respectively.

4. The power conversion system of claim 3, wherein each of the output switches is electrically connected to the controller.

5. The power conversion system of claim 4, wherein the controller turns on at least one of the output switches to output a current.

6. The power conversion system of claim 4, wherein when the controller controls one of the output switches to close, the power-converting unit which electrically connected to the closed output switch outputs a current.

7. The power conversion system of claim 4, wherein when the controller controls part of the output switches to close, the power-converting units which electrically connected to the closed output switches output a current, wherein the current is summation of output current of the power-converting units which electrically connected to the closed output switches.

8. The power conversion system of claim 1, wherein the primary winding disposes on the winding portions, the power-converting units insert into the slots, and a portion of the magnetic core is disposed in the first channel.

9. The power conversion system of claim 1, wherein the first channel crosses through the winding portions and the receiving portions.

10. A power conversion system comprising:
    a switch module;
    a resonant module;
    a magnetic conversion module comprising;
        a primary winding; and
        a printed circuit board (PCB) winding module comprising:
            a printed circuit board;
            a conductive layer disposed on at least one surface of the printed circuit board; and
            a switch unit electrically connected to the printed circuit board, wherein the switch unit is configured to receive a converted electric power from the conductive layer;
    a bobbin including a slot to contain the PCB winding module, wherein the bobbin has a first channel crossed through the slot; and
    an iron core.

11. The power conversion system of claim 10, wherein the power conversion system further comprises a main circuit board, and the switching module, the resonant module and the magnetic conversion module are disposed on the main circuit board.

12. The power conversion system of claim 11, wherein the primary winding receives the power from the resonant module, the primary winding has the magnetic induction with the PCB winding module via the iron core, the switch unit rectifies a current received from the conductive layer, and the rectified current is outputted to the main circuit board.

13. The power conversion system of claim 11, wherein the power conversion system further comprises an output-controlling device, and the output-controlling device comprises a controller and an output-controlling module electrically connected to the controller, wherein the PCB winding module is electrically connected to the output-controlling module.

14. The power conversion system of claim 10, wherein the slot includes a first opening and a second opening.

15. The power conversion system of claim 14, wherein a first distance is defined as the length between top of the first channel and ceiling of the slot, and a second distance is defined as the length between bottom of the first channel and ground of the slot, wherein the first distance and the second distance are greater than 0.

16. The power conversion system of claim 15, wherein a third distance is defined as the length between rightmost of the first channel and the first opening, and a fourth distance is defined as the length between leftmost of the first channel and the second opening, wherein the third distance and the fourth distance are greater than 0.

* * * * *